United States Patent [19]
Elworthy

[11] Patent Number: 6,125,362
[45] Date of Patent: Sep. 26, 2000

[54] DATA PROCESSING METHOD AND APPARATUS FOR IDENTIFYING CLASSIFICATION TO WHICH DATA BELONGS

[75] Inventor: David Elworthy, Guilford, United Kingdom

[73] Assignee: Canon Kabushiki Kaisha, Tokyo, Japan

[21] Appl. No.: 08/985,315

[22] Filed: Dec. 4, 1997

[30] Foreign Application Priority Data

Dec. 4, 1996 [GB] United Kingdom .................. 9625284

[51] Int. Cl.[7] ..................................................... G06F 17/30
[52] U.S. Cl. ..................................................... 707/6; 704/8
[58] Field of Search ..................................... 707/6; 704/8

[56] References Cited

U.S. PATENT DOCUMENTS

| | | | |
|---|---|---|---|
| 4,654,875 | 3/1987 | Srihari et al. | 382/229 |
| 5,251,268 | 10/1993 | Colley et al. | 382/156 |
| 5,548,507 | 8/1996 | Martino et al. | 704/1 |
| 5,842,163 | 11/1998 | Weintraub | 704/240 |
| 5,848,388 | 12/1998 | Power et al. | 704/239 |
| 5,870,706 | 2/1999 | Alshawi | 704/255 |
| 5,910,107 | 6/1999 | Iliff | 600/300 |

FOREIGN PATENT DOCUMENTS

| | | | |
|---|---|---|---|
| 023696A1 | 9/1987 | European Pat. Off. | G10L 1/06 |
| 0621542A2 | 10/1994 | European Pat. Off. | G06F 15/20 |
| 1554884 | 10/1979 | United Kingdom | G06K 9/00 |

OTHER PUBLICATIONS

"A Robust, Segmental Method For Text Independent Speaker Identification"; by H. Gish et al., vol. 1, Adelaide, pp. 145–148 XP000529375.

"Language Determination: Natural Language Processing From Scanned Document Images"; 4th Conf. on Applied Natural Language Processing. Stuttgart, Oct. 1994; pp. 15–21.

"Language Identification: Examining the Issues"; P. Sibun et al. pp. 125–135.

"Good–Turning Frequency Estimation Without Tears"; by Wm. A. Gale et al.; Journal of Quantitative Linguistics 1995, vol. 2, No. 3, pp. 217–237.

*Primary Examiner*—Wayne Amsbury
*Attorney, Agent, or Firm*—Fitzpatrick, Cella, Harper & Scinto

[57] ABSTRACT

A data processing method and apparatus is described for identifying a classification to which data belongs where the data comprises a plurality of features at least some of which are common to a plurality of classifications. The features of the data are extracted as sequential elements which are sequentially input until the classification to which data belongs is identified. The elements are compared with predetermined probability values for the elements of each classification to determine a probability that the elements belong to a classification. The probabilities are accumulated to form an accumulated probability for each classification and a classification to which data belongs is identified from the accumulated probability.

57 Claims, 19 Drawing Sheets

DATA PROCESSING METHOD AND APPARATUS FOR IDENTIFYING CLASSIFICATION TO WHICH DATA BELONGS

The present invention generally relates to a data processing method or apparatus for identifying a classification to which data belongs.

There are many applications wherein data can be classified into various classifications and it is desirable to be able to identify a classification to which data belongs.

One such application is in electronic document handling wherein documents such as letters, memos and papers are sorted to allow cataloguing and storage in different places for example. It would therefore be desirable to provide a system which can recognise and identify documents to enable them to be processed differently.

It would also be high advantageous if documents could be recognised by their subject matter in order that documents could be stored or classified accordingly.

Other areas where the identification of the classification of data is required is in speech recognition and optical character recognition. In both of these types of data. processing it would be advantageous to analyze the data and classify it in order to simplify processing. For example the data could be analyzed to determine its field e.g. scientific or legal, or it could be analyzed to determine in which language the speech or text is in.

The problem of automatic language identification has already been addressed in a paper by P Sibun & A L Spitz ('Language Determination: Natural Language Processing from Scanned Document Images'. Proceedings of the Fourth Conference on Applied Natural Language Processing pages 15 to 21. Association for Computation Linguistics). In conventional optical character recognition (OCR) a model of the language can improve the OCR systems accuracy. However, in order for a model of the language to be used it is necessary for the language of the text to be known. This of course is not possible conventionally without recognising the text. However, in the paper by Sibun & Spitz it has been shown that accurate language identification can be achieved using word shape tokens which are simple representations of the words in the scanned image and consist of an approximate description of the shape in each letter. Thus, all 'tall' letters (such as h, k and l etc) can be grouped into one class, all letters with a tail (such as g and y) into a second class, all letters with a dot (such as i) into a third class, small letters (such as a, n and z) into a fourth class, and so on. In this way character shape recognition can be undertaken with a low error rate without the need for full scale OCR. Using such character shapes Sibun & Spitz developed a language identifier using a statistical model based on linear discriminate analysis (LDA) to decide on the most likely language. When applied to a test collection of 23 languages, their approach achieved an accuracy of 91%, measured as the number of documents for which the correct language was assigned. Many errors occurred with languages which are related, such as the groups Dutch/Afrikaans and French/Spanish/Italian/Portuguese/Rumanian. One problem with the approach of Sibun & Spitz is that all of the text must be analyzed in order for automatic language identification to take place. A further problem with the LDA approach of Sibun & Spitz is that removing any language from the model can reduce the accuracy of the remaining languages.

An alternative approach has been presented by P Sibun & J C Reynar ('Language Identification: Examining the Issues'. Proceedings of the Fifth Annual Symposium on Document Analysis and Information Retrieval, pages 125 to 136. University of Nevada, Las Vegas). This approach is based on collecting statistics about the distribution of single character shape tokens (unigrams) or adjacent pairs of character shape tokens (bigrams). The recognition test is based on the relationship between the probability distribution of unigrams or bigrams in the test set and in the training sets for each of the languages. Unigrams, over a test with eighteen languages, achieves 77 to 99% accuracy, depending on the number of lines of data in the training and test sets, and 90 to 100% accuracy with bigrams. The approach is not sensitive to removal of languages from the model and achieves much better accuracy on a test involving only three languages. Similar languages are however still a source of many errors, though to a lesser degree than in the Sibun & Spitz method.

It is an object of the present invention to provide a data processing method and apparatus which is more accurate than the prior art in identifying a classification to which data belongs.

In accordance with one aspect, the present invention provides a data processing method for identifying the classification to which data belongs, the data comprising a plurality of features at least some of which are common to a plurality of classifications, the method comprising the steps of:

extracting the features of the data as sequential elements and sequentially inputting the sequential elements or groups of elements until the classification to which the data belongs is identified;

for each element or groups of elements, comparing the element or group of elements with predetermined probability values for elements or group of elements of each classification to determine a probability that the element or group of elements belong to a classification;

accumulating the probabilities to form an accumulated probability for each classification; and identifying a classification to which the data belongs from the accumulated probability.

In accordance with a second aspect the present invention provides data processing apparatus for identifying a classification to which data belongs, the data comprising a plurality of features at least some of which are common to a plurality of classifications, the apparatus comprising input means for extracting the features of the data as sequential elements and for sequentially inputting the sequential elements until the classification to which the data belongs is identified;

storing means for storing predetermined probability values for each classification;

comparison means for sequentially comparing each element or group of elements with said predetermined probability values for each classification to determine a probability that the element or group of elements belong to a classification;

accumulation means for accumulating the probabilities to form an accumulated probability for each classification; and identification means for identifying a classification to which the data belongs from the accumulated probability.

The identified classification can be output together with the accumulated probability and used for the further processing of data. For example where the data belongs to different classifications and requires processing in different ways, the identified classification can be used to select the processing operations to be carried out on the data.

In accordance with one embodiment of the present invention a classification is identified as a classification to which the data belongs if the accumulated probability reaches a predetermined probability threshold.

The classification can be identified as the classification to which the input data belongs if the accumulated probability of the classification reaches the predetermined probability threshold and the accumulated probability for the classification is greater than the accumulated probabilities of each of the other classifications by a predetermined amount.

If the accumulated probabilities of the classifications do not reach the predetermined probability threshold, several of the classifications having the highest accumulated probabilities can be identified as possible classifications to which the data belongs.

In one embodiment each of the probabilities and accumulated probabilities comprise a minimum likely value for the probability within a predetermined confidence range, a maximum likely value for the probability with a predetermined confidence range and a base value for the probability which is the most likely value, and a classification is identified as the classification to which the input data belongs if the base value of the accumulated probability for the classification reaches said predetermined probability threshold. Further, a classification may only be identified as the classification to which the input data belongs if the base value of the accumulated probability for the classification reaches said predetermined probability threshold and the minimum likely value for the accumulated probability for the classification is greater than the maximum likely values of the accumulated probabilities of each of the other classifications.

If the base values of the accumulated probabilities for the classifications do not reach the predetermined probability threshold several of the classifications having the highest base values of the accumulated probabilities can be identified as possible classifications to which the data belongs.

If the minimum likely value of the accumulated probability for the classification having the highest base value is not greater than the maximum likely value of the accumulated probabilities of each of the other classifications, the classifications having the maximum likely values of the accumulated probabilities which are greater than the minimum likely values of the classification having the highest base value can be identified as possible classifications to which the data belongs.

In an alternative embodiment of the present invention a classification can be identified as a classification to which the data belongs if the accumulated probability is greater than the accumulated probability of each of the other classifications by a predetermined amount.

If the highest accumulated probability is not greater than each of the other accumulated probabilities by said predetermined amount, several of the classifications having the highest accumulated probabilities by said predetermined amount, several of the classifications having the highest accumulated probabilities can be identified as possible classifications to which the data belongs.

Each of the probabilities and accumulated probabilities can comprise a minimum likely value for the probability within a predetermined confidence range, a maximum likely value for the probability within a predetermined confidence range, and a base value for the probability which is the most likely value, and a classification can be identified as the classification to which the data belongs if the base value of the accumulated probability for the classification is greater than the base values of the accumulated probabilities of the other classifications.

Where several of the classifications are identified as possible classifications to which the data belongs, a user can manually select a classification from among the possible classifications.

In a specific embodiment the minimum and maximum likely values of the probabilities are calculated as being two or more standard deviations from the base values of the accumulated probabilities. This gives a confidence of at least 95%.

The elements which are input can comprise separate sequential elements or separate groups of sequential elements. The predetermined probability values are probability values which define the probability that the individual elements or groups of elements belong to a classification.

The features of the data can be extracted by coding the features of the data as sequential elements. The number of different elements compared with the number of different features in the data can be reduced by coding.

Alternatively, where the features of the data are directly usable, the features can be extracted simply by identifying each element in the data which comprises a feature.

The frequency of occurrence of each element or group of sequential elements can be determined and used to calculate the probability values for the sequential elements or groups of elements.

The predetermined probability values for the sequential elements can be calculated by calculating the probability of the occurrence of an element or group of elements in the data input for all of the classifications, setting the probability of the occurrence of the classification to a preset level, and calculating the probability of an element or group of elements occurring in a classification. Such a calculation can be performed using Bayes Rule which is given by $$p(l|t) = \frac{p(t|l) \cdot p(l)}{p(t)}$$

where:
- $p(l|t)$ is the probability of the classification given the element
- $p(t|l)$ is the probability of the element given the classification
- $p(l)$ is the probability of the classification
- $p(t)$ is the probability of the element.

For certain applications the probability of the occurrence of a classification is the same for all classifications and can therefore be ignored in the calculations.

The predetermined probability values can comprise a minimum likely value for the probability, a maximum likely value for the probability and a base value for the probability which is the most likely value. The minimum and maximum values can be calculated as probability values lying within a predetermined confidence range of the base value. Preferably, a high confidence range is used of 95% or more and thus the minimum and maximum likely values are within two or more standard deviations of the base value based on the assumption of a normal distribution. Although the training data can be designed to include a fairly representative range of elements which are likely to occur in the input data, in some cases, it is not practical to ensure that the training data includes all possible elements or groups of elements. In such circumstances probability values are calculated for each classification for elements or groups of elements which do not occur in the training data. This provides a default probability for input elements or groups of elements which do not correspond to any of the elements or groups of elements in the training data.

The present invention can be used for the classification of data of many different types. The input data can for instance comprise OCR data or speech recognition data and the feature vectors which are normally generated during such recognition can be operated upon to form elements or groups of elements thereby extracting the features of the data. The elements in such systems can comprise individual letters or phonemes and the groups of elements can be words or utterances for example. The features could alternatively be higher level structures such as groups of words or utterances. For OCR data, groups of elements can also comprise bigrams or trigrams as for instance used by Sibun and Spitz. The processing of the data allows for the identification of any classification to which the data may belong e.g. a language, or subject of text or speech.

Using the method of the present invention the classification to which documents in electronic form belong can be identified allowing for the automatic sorting of such documents. Such documents can be classified into the type of document e.g. letter, memo or paper, or topic e.g. legal or scientific. The type of document can be identified from the layout of the document e.g. the position and/or shape of the paragraphs. The topic of a document can be identified by identifying the occurrence of certain words within the document and comparing these with the probability of the occurrence of these documents in various known classifications. For document classification a group of elements can comprise a page.

The present invention may also be applied to image or pattern recognition where images can be classified.

The present invention is thus applicable to a wide range of types of input data which is comprised of a plurality of features at least some of which are common to a plurality of classifications.

The present invention enables a fast identification process since the features of the data are analyzed sequentially and as soon as the classification can be identified with confidence e.g. the probability threshold is exceeded, the identified classification can be output. Thus, in many situations the classification identification process is far quicker than Sibun & Spitz's method since not all of the data needs be analyzed.

Another advantage of embodiments of the present invention is that a decision on the identified classification is only output if the probability threshold is exceeded. In this way in accordance with embodiments of the present invention a decision is only made when confidence in the decision is high. This avoids the case which occurs in the Sibun & Spitz system wherein a decision can be made regarding the classification which is erroneous since there are several likely classification within an error or confidence range.

Embodiments of the present invention will now be described with reference to the accompanying drawings in which.

Figure 1:
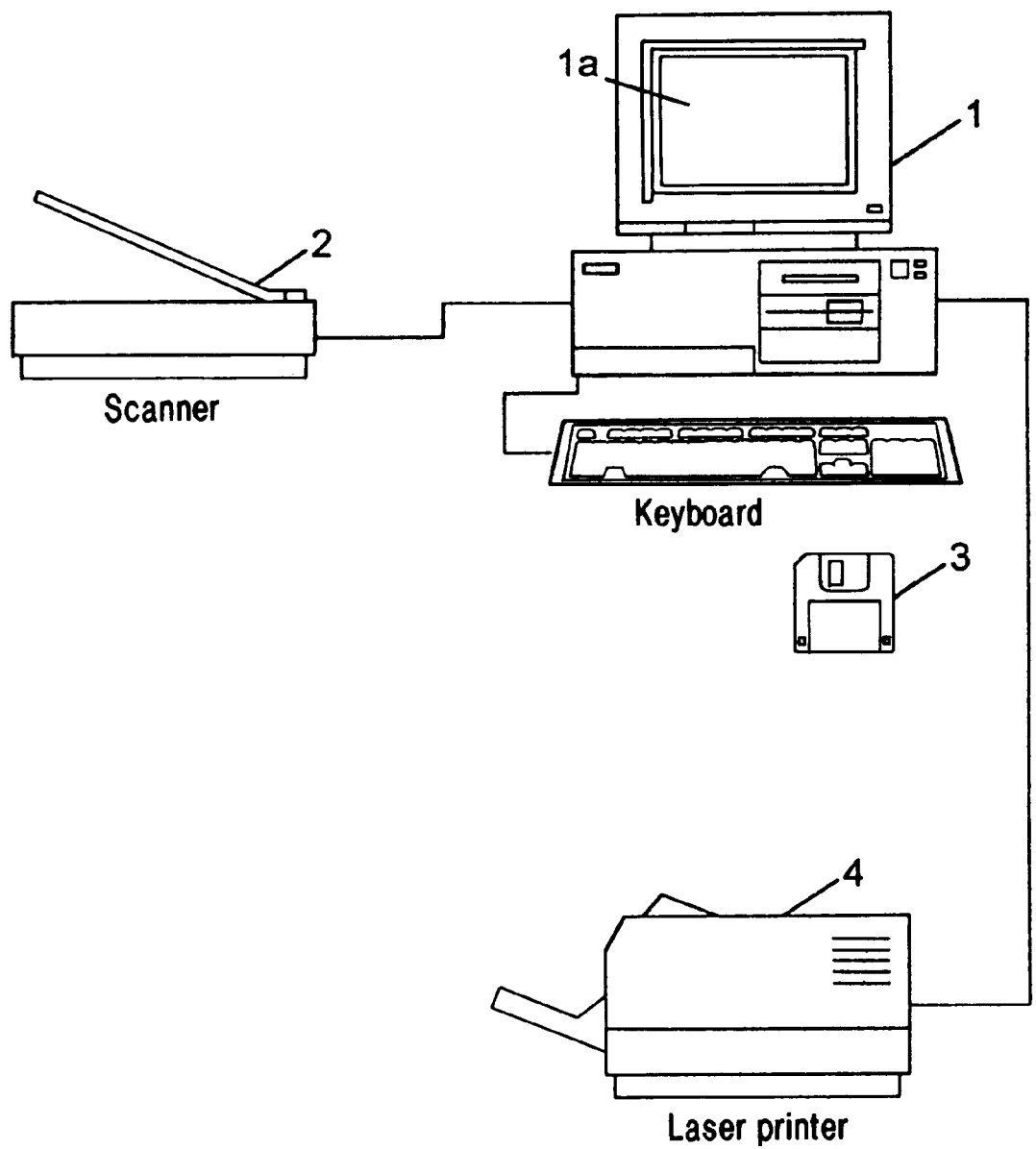
FIG. 1 is a schematic drawing of a data processing system in accordance with one embodiment of the present invention.

FIG. 1 illustrates a typical system for data processing in accordance with one embodiment of the present invention. The data is processed by a personal computer under the operation of a computer program. The computer program can be stored on the internal hard disc drive or can be provided to the computer 1 on a computer readable medium such as a floppy disc 3. The data for processing can be input from an input device such as a scanner 2 in a case of OCR data. The data can however be input by any suitable input device such as a modem (not shown) or a computer readable medium such as a floppy disc 3. The result of the processing can cause an output for example on the display 1a of the computer 1. The identification result could also be output to an output device such as a laser printer 4. Also, the result of the identification can be used to determine how the data is processed. Where data belonging to different classifications is required to be processed different, the result of the identification can be used to cause the required different processing. Thus for example when the input data is OCR data and the classification which is to be identified is the language of the OCR data, the identified language can be used to cause a specific library or model to be used in the OCR processing of the data.

Figure 2:
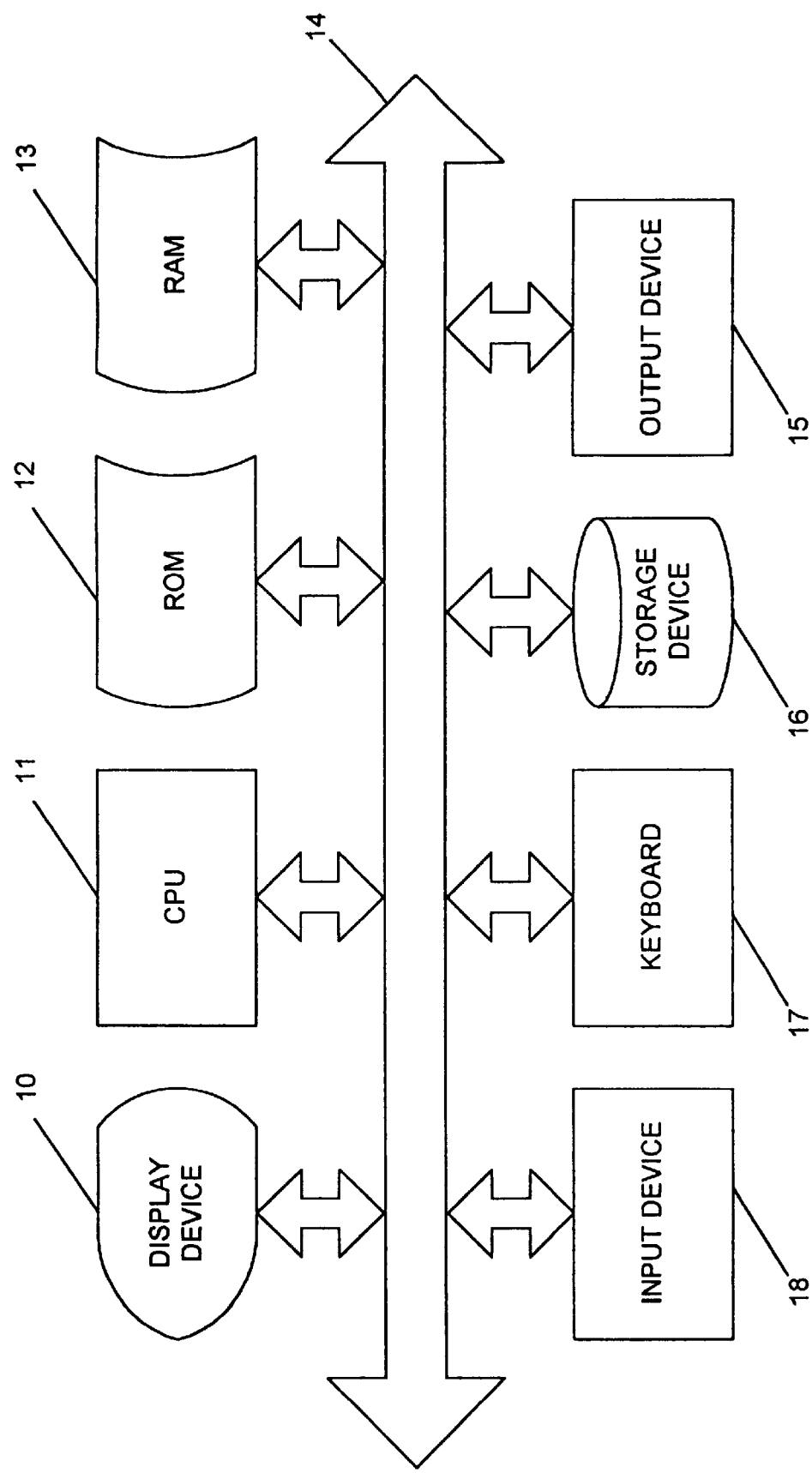
FIG. 2 is a schematic drawing of the architecture of the data processing system of FIG. 1.

FIG. 2 illustrates schematically the internal architecture of the system of FIG. 1. A bus 14 links all of the elements of the system to allow communication therebetween. A display device 10 is connected to the bus 14 to allow the display of data. A central processing unit 11 is provided to process the data which can be retrieved from a storage device 16 and temporarily stored in a random access memory (RAM) 13. A read only memory (ROM) 12 is also provided and they typically contain this system basic input/output system (bios). A keyboard 17 is provided to forward the input data and commands. An input device 18 provides for the input of data for processing and the output device 15 provides for the output of processed data.

Figure 3:
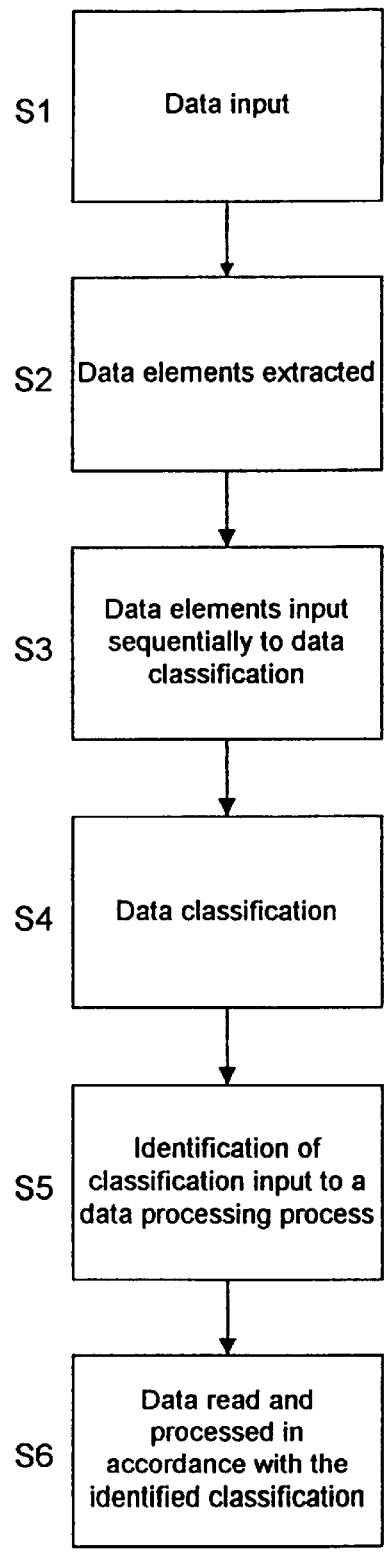
FIG. 3 is a flow diagram of the general steps for processing data in accordance with one embodiment of the present invention.

FIG. 3 is a flow diagram of the general operation of an embodiment of the present invention. In step S1 data is input to the system. In step S2 data elements are extracted either by simply identifying elements in the data or by coding features of the data as elements. In step S3 the extracted data elements are input sequentially for data classification and in step S4 the data is classified by comparing the input elements with predetermined probability values for elements of each classification to determine the probability that the elements belong to the classification. The probabilities are accumulated to form an accumulated probability for each classification and from this the classifications to which the data belongs can be identified.

The identification obtained in S4 can then be used for the further processing of the data. In step S5 the identification of the classification is input to a data processing process and in step S6 the data is read and processed in accordance with the identified classification.

Figure 4:
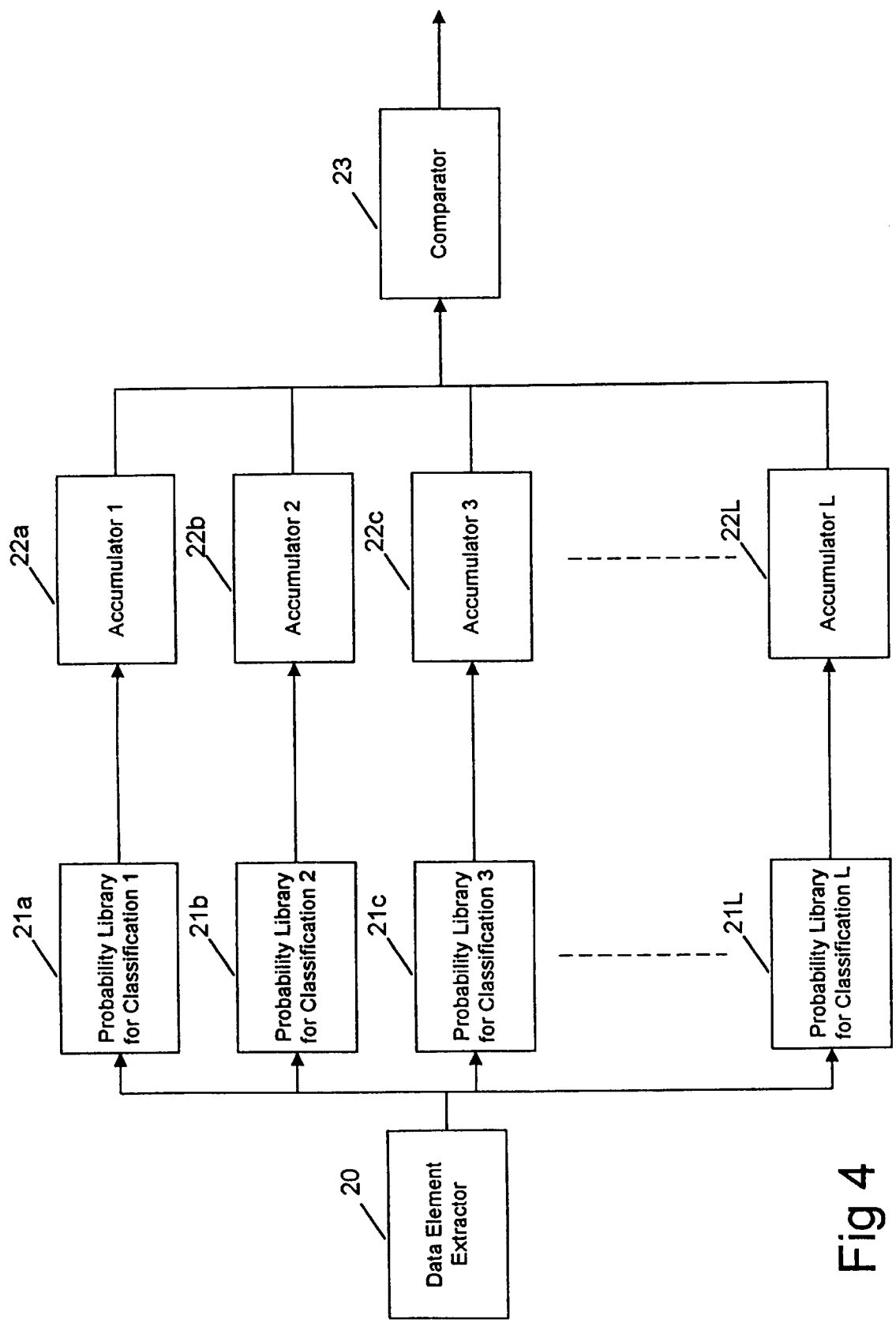
FIG. 4 is a schematic functional drawing of a data processing system in accordance with one embodiment of the present invention.

FIG. 4 is a schematic functional illustration of the classification identification system in accordance with one embodiment of the present invention. At 20 the data elements are extracted and input to each of the probability libraries 21$a$,21$b$,21$c$ . . . 21L for the classifications. The respective probability for the element belonging to the classification is output from the respective probability library 21$a$,21$b$,21$c$ . . . 21L to respective accumulators 22$a$,22$b$,22$c$ . . . 22L. The accumulators 22$a$,22$b$,22$c$ . . . 22L accumulate the probabilities and output the probabilities to a comparator 23 for the comparison of the accumulated probabilities to determine when a classification can be identified with confidence.

Specific embodiments of the present invention will now be described with reference to FIGS. 5 to 16 which are applied to language identification of OCR data.

Figure 5:
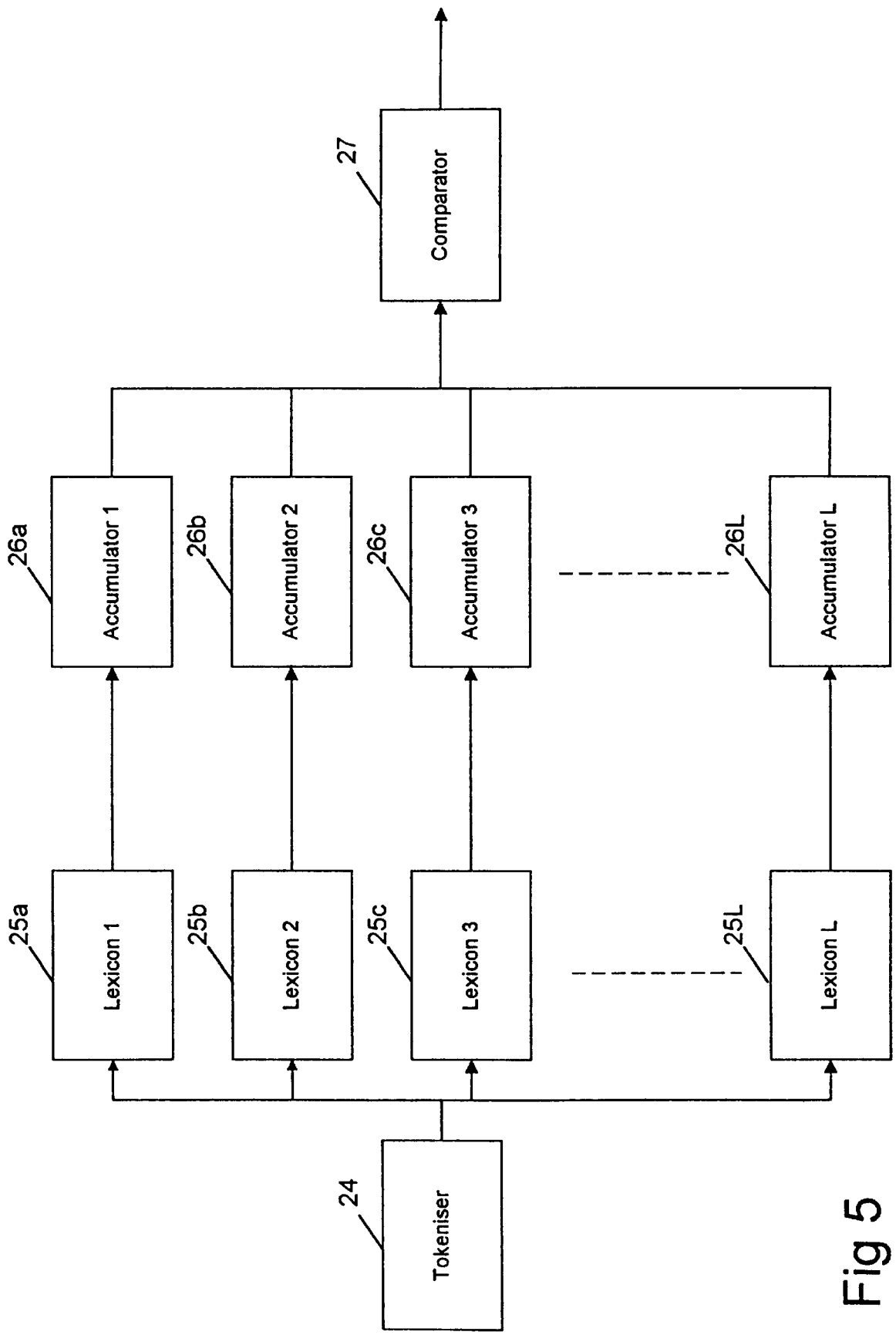
FIG. 5 is a schematic functional drawing of a language identification system in accordance with one embodiment of the present invention.

FIG. 5 is a schematic functional drawing of the language identification system. A tokeniser 24 extracts the features of the OCR data by tokenising the letters to form groups of elements comprising word tokens. Methods which can be used are the methods described in the articles by Sibun & Spitz and Sibun & Reynar. The word tokens are then input to each of the lexicons 25$a$,25$b$,25$c$ . . . 25L for the languages to which the OCR data may belong. The lexicons 25$a$,25$b$,25$c$ . . . 25L comprise predetermined probability values that the word token belongs to the language. The probability output from the lexicons 25$a$,25$b$,25$c$ . . . 25L are input to respective accumulators 26$a$,26$b$,26$c$ . . . 26L where the probabilities for sequential word tokens are accumulated to form an accumulated probability. The accumulated probabilities of each of the accumulators 26$a$,26$b$,26$c$ . . . 26L are input to a comparator 26 wherein the probabilities are compared with one another and with a predetermined threshold to determine whether a language is uniquely identifiable as the language to which the OCR data belongs.

Before language identification can be carried out, the lexicons must be trained. To train the lexicons, a collection of documents for which the correct language is known is tokenised and a frequency distribution of the tokens for the language is produced. A probability distribution for the language is then computed. There is no need for the same amount of training data to be used for each of the languages and the probabilistic model for one language is independent of the others.

The probability that is to be derived is the probability that a given token t is a member of language 1, written as p(l|t), i.e. the probability of the language given the token. Bayes' Rule gives us that:

$$p(l|t) = \frac{p(t|l) \times p(l)}{p(t)} \qquad (1)$$

Where p(t|l) is the probability of the token t given the language 1, p(l) is the a priori probability of the language, and p(t) is the a priori probability of the token. There are a number of ways of estimating the quantity p(t|l), p(l) and p(t) from the training data. One such method is used in this embodiment of the present invention.

It is assumed that all languages are equiprobable. p(l) is then a constant factor in the computation of p(l|t) for any l and any t. Since the absolute value of the p(l|t) is not needed, p(l) can be dropped from equation 1.

The procedure for calculating both p(t|l) and p(t) from training data is as follows. For a given token t, let m be the frequency of that token in the training data and n the total number of tokens. Both counts are for the totals in a given language for p(t|l) and across all languages for p(t). Three probabilities are calculated which are called the base probability (denoted $p_B$) the low probability (denoted $p_L$) and the high probability (denoted $p_H$). These probabilities represent the probability of the occurrence of the token within a given limit of confidence. Thus $p_L$ is the lowest probability for the token which is likely, $p_H$ is the highest probability, and $p_B$ is a value which is normally at or near the middle of the range. Only the base probability is used for p(t) in this embodiment although the full range can be used.

The probability calculations are different depending on the frequency of occurrence of the tokens in the training data. High, medium, low and zero frequency ranges are used. The decision about which of the classifications is to be used is made on the basis of the value of m. The high frequency calculation is a slightly more approximate form of the medium frequency calculation and requires marginally less computation. The low frequency calculation is a more computationally intensive calculation, but involves less approximation. The zero frequency compensation is used for tokens which are not seen in the training data, but which might occur in the input data.

It is assumed that the probabilities follow a binomial distribution. The justification for this is to treat each token occurrence as an 'event' which is either the token t or not. On the basis of the observed frequency of the token the underlying probability of the binomial distribution which would have led to this many 'events' i.e. occurrence of the token is then computed.

For high frequencies the standard result that the mean number of 'successes' in n trials of a binomial distribution with underlying probability p is given by:

$$\mu = np \qquad (2)$$

Setting $\mu$ equal to the observed number of occurrences m, p can be found from:

$$p = m/n \qquad (3)$$

The standard deviation σ in the number of occurrences is given by:

$$\sigma = \sqrt{np(1-p)} \quad (4)$$

To calculate the minimum and maximum probability $p_L$ and $p_H$ d standard deviations from the base value $p_B$ are taken giving:

$$p_L = (m - d\sigma)/n \quad (5)$$

$$p_H = (m + d\sigma)/n \quad (6)$$

In this embodiment the number of standard deviations d is set to 2, which gives 95% confidence in the band of probabilities.

For tokens in the middle frequency range, the calculation is made more exact by substituting the low probability into the right side of equation 5 giving:

$$p_L = \frac{(\mu - d\sigma)}{n} = \frac{\left(m - d\sqrt{np_L(1-p_L)}\right)}{n} \quad (7)$$

which can be solved for $p_L$ by assuming that the probabilities are small, and hence that $(1-p_L)$ is approximately equal to 1. Computing the probabilities is then just a matter of solving the quadratic in the probability giving:

$$p_L = \frac{\left(\sqrt{d^2 + 4m} - d\right)^2}{4n} \quad (8)$$

As in the first case, d is set to 2 for 95% confidence. Similar reasoning gives $$p_H = \frac{\left(\sqrt{d^2 + 4m} + d\right)^2}{4n} \quad (9)$$

The base value is calculated in the same way as in the high frequency case.

For low frequencies, we solve the binomial expansion exactly. The definition of the binomial distribution gives the probability of m successful events from a probability distribution with an underlying probability of p and n trials in total given by:

$$p(m) = p^m (1-p)^{(n-m)} \frac{n!}{m!(n-m)!} \quad (10)$$

Since p is small, the term in (1−p) can be approximated to 1. For 95% confidence range, the equation is solved for p(m)=0.025, p(m)=0.5 and p(m)=0.975, yielding $p_L$, base probability $p_B$ and $p_H$, respectively. For example for the base probability we have:

$$p_B = \sqrt[m]{0.5 m!(n-m)!/n!} \quad (11)$$

Also a special case must be made for calculating the probability of unknown events i.e. for tokens which did not appear in the training data. This is what is called the zero probability above. The approach used for low frequencies cannot simply be followed with m=0, since this leads to the absurd situation of the lower probability (2.5% level) being greater than the high probability (97.5% level), since the equation which reduces to:

$$p = 1 - \sqrt[n]{t} \quad (12)$$

where t is the threshold value of 0.025 or 0.975. Instead the approximation of setting the low and high values equal is used and they are calculated from equation 12 with t=0.95 i.e at the point where we have 95% confidence in the value computed for p. This is the same as the calculation used for the zero probability of p(t).

The calculations are best performed by taking logarithms and hence reducing multiplication of terms to addition and raising to powers and taking roots to multiplications and divisions. Problems with numerical overflow and underflow can also be avoided by doing this.

The steps performed in the training operation will now be described in detail with regard to FIGS. 6a, 6b and 6c where m is the frequency of a word in a language M is the frequency of a word in all of the languages, n is the total frequency of all words in a language, and N the total frequency of all words in all the languages.

In step S10 N and M are set to zero. In step S11 a language is selected for training and in step S12 n and m are set to zero. In step S13 a first word token is read in and in step S14 the word token count is incremented. In step S15 it is determined whether the word token is present in the accumulator table. If, as will of course be the case for the first word token, the word is not present in the accumulator table, in step S16 the word token is added to the accumulator table with a frequency of the word in the language given as 1 i.e. m=1. If the word token is determined to be in the accumulator table, in step S17 the frequency of the word in the language m is incremented for the word token.

In step S18 it is then determined whether the word token is present in the global table. If it is not present then the word token is added to the global table and the frequency of the word token M is set to 1. If the word token is present in the global table the frequency of the word token M is incremented in step S20.

In step S21 it is then determined whether there are any more word tokens and if so the process returns to step S13 to sequentially read the next word token. If all of the word tokens for a language have been read in step S22 it is determined whether there are any more languages for which training data is to be read. If training data for further languages is to be read the process returns to step S11. If there is no further training data for languages then the values for the frequencies m, M, n and N have been determined and the process can now proceed on to determine the probabilities.

Figure 6A:
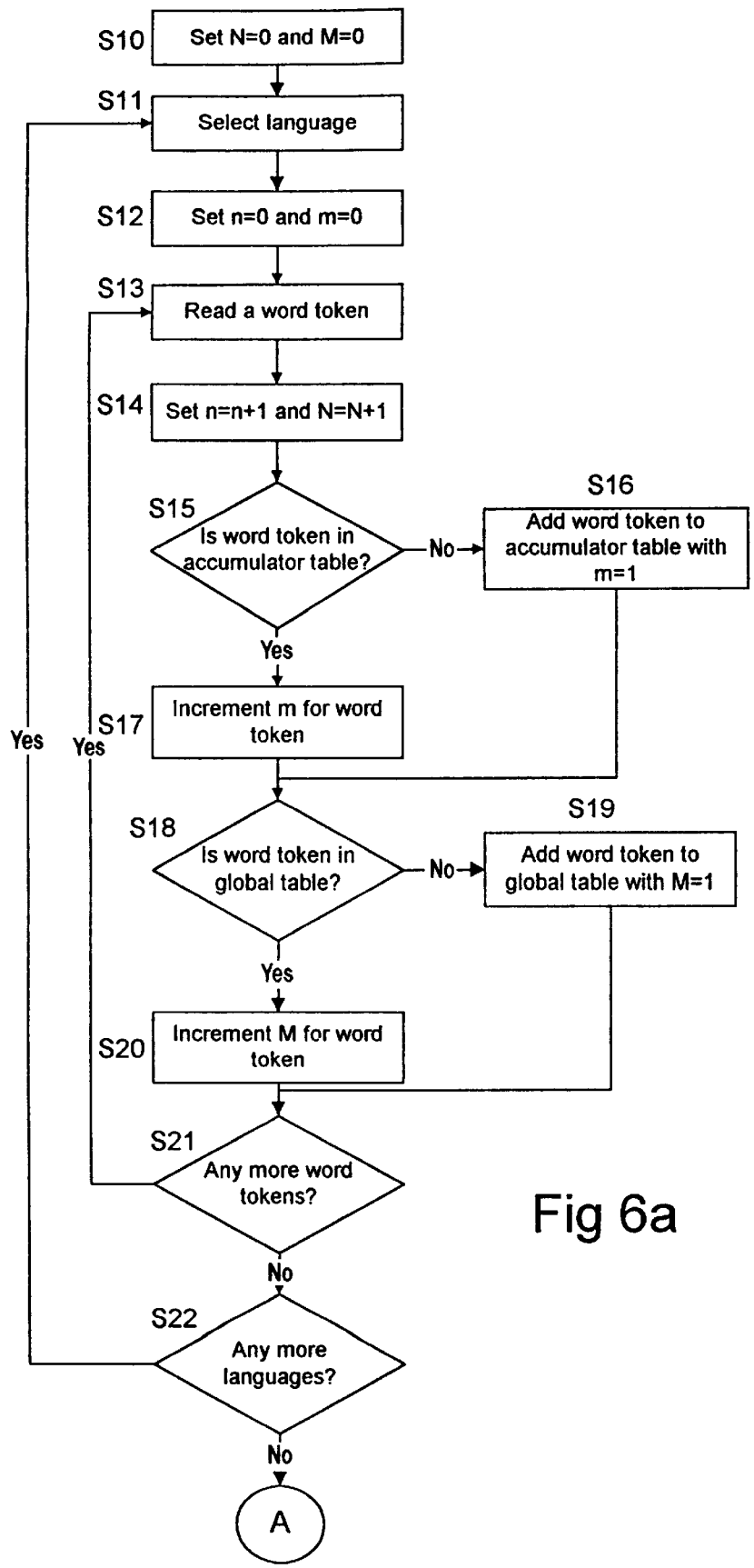
FIGS. 6a, 6b and 6c are flow diagrams illustrating the learning phase of the language identification system of FIG. 5.
Figure 6B:
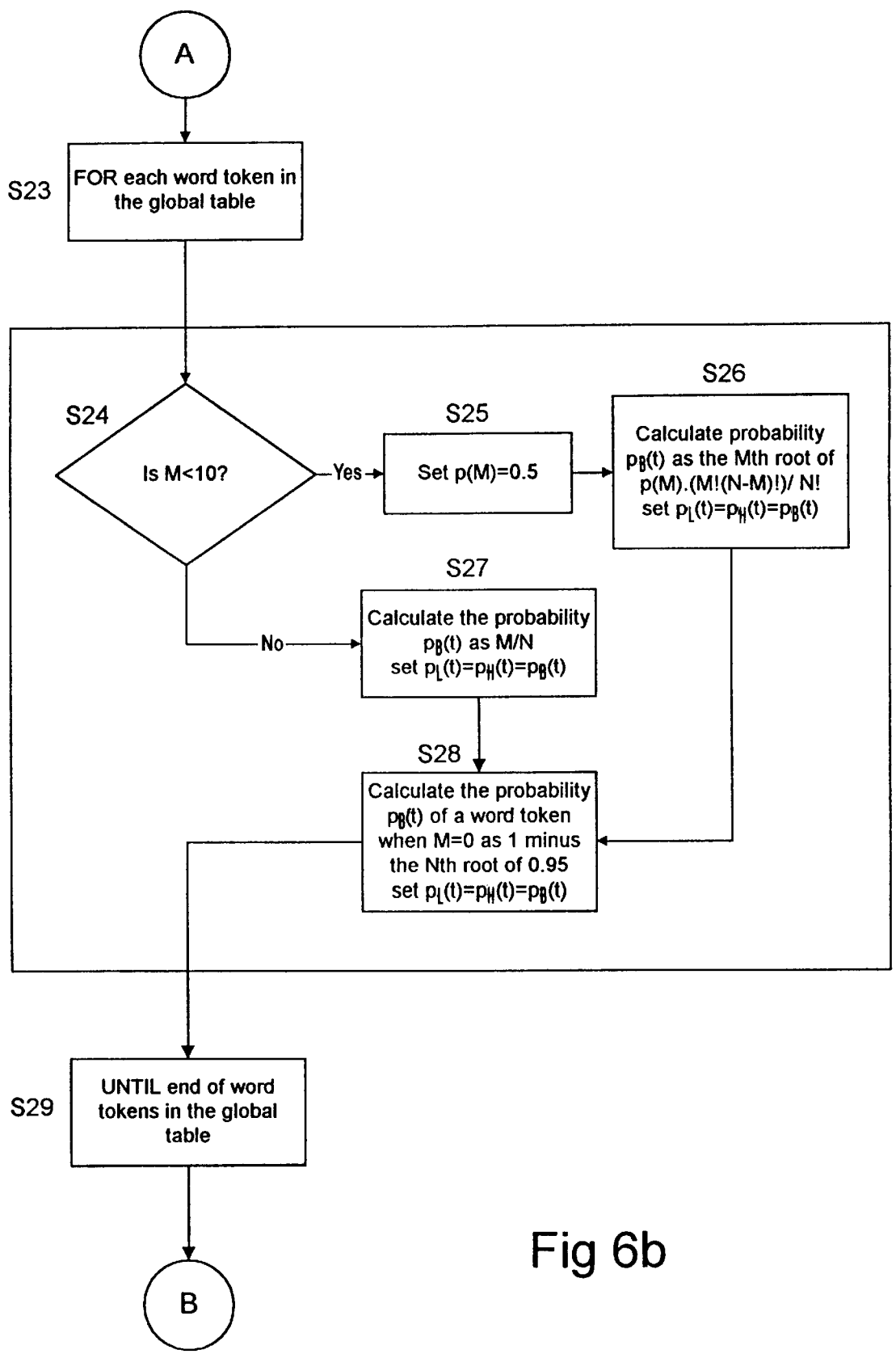

The steps illustrated in FIG. 6b from step S23 to step S29 are repeated for each word token in the global table. In step S24 it is determined whether the total frequency of all the word tokens in the language (M) is less than 10. If so, in step S25 p(m) is set to 0.5 and in step S26 the probability for the word token in the global table is calculated using equation 11. If M is not less than 10, in step S27 the probability of the word token in the global table is calculated from M/N. Then in step S28 the probability of a word token in the global table when M=0 is calculated from:

$$p = 1 - \sqrt[N]{0.95} \quad (13)$$

Steps S24 to S28 are then repeated for each of the word tokens in the global table to form the probability values $p_L(t)$, $p_H(t)$ and $p_H(t)$.

Figure 6C:
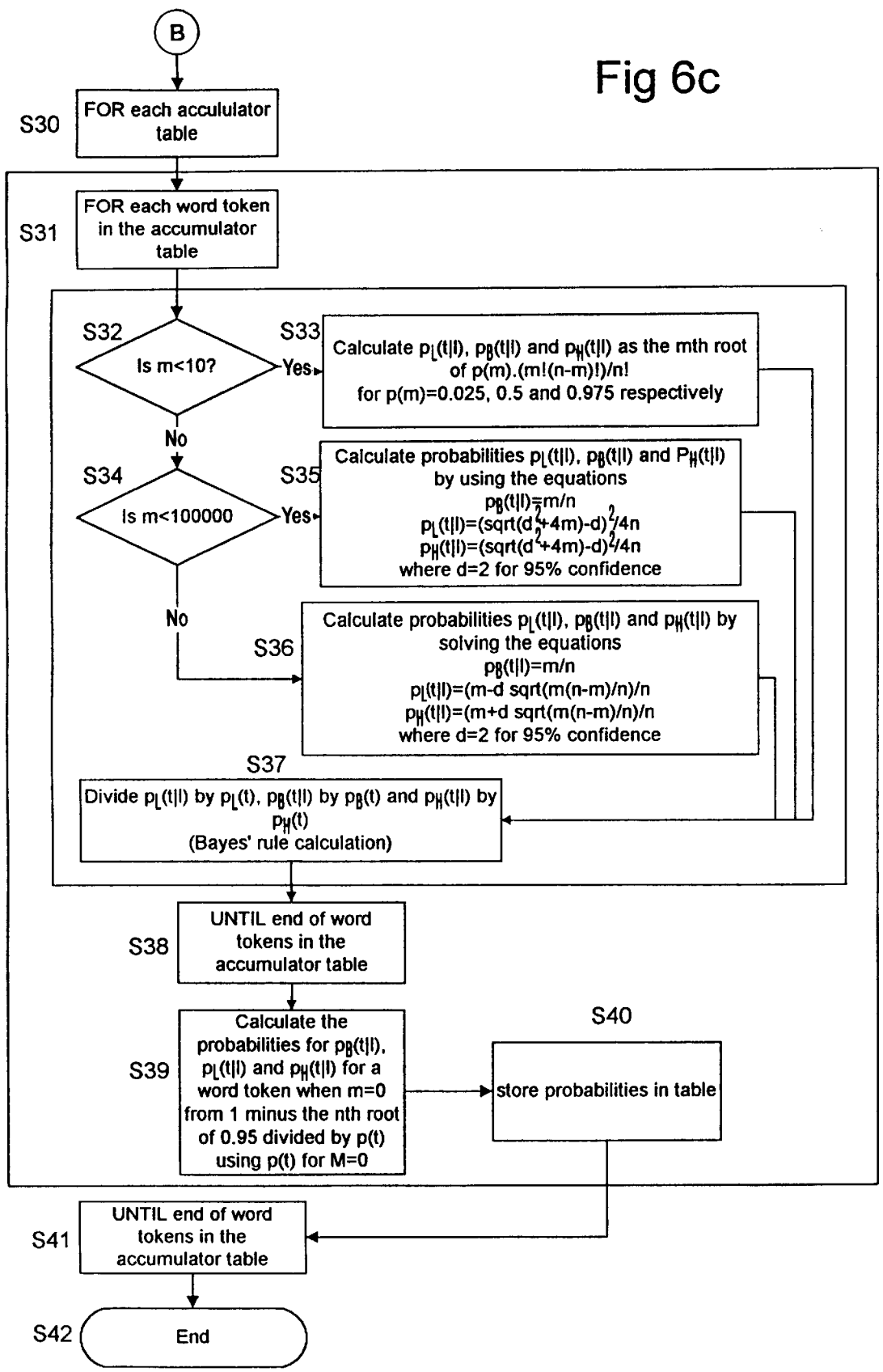

The process then proceeds to FIG. 6c where the probabilities for each of the word tokens in each of the accumulator tables is calculated. Steps S31 to S38 are repeated for each word token in an accumulator table and steps S30 to S41 are repeated for each accumulator table. In step S32 it is determined whether m is less than 10 and if so in step S33 the low, base and high probabilities are calculated for p(m)=0.025, 0.5 and 0.975 respectively from:

$$p = \sqrt[m]{p(m)m!(n-m)!/n} \quad (14)$$

If m is not less than 10 in step S34 it is determined whether m is less than 100000.

In step S34 if m is less than 100000 in step S35 the base probability is calculated from equation 3, the low probability is calculated from equation 8 and the high probability is calculated from equation 9 where d=2 for 95% confidence.

If in step S34 it is determined that m is not less than 100000, in step S36 the base probability is calculated from equation 3, the low probability is calculated from:

$$p_L = (m - d\sqrt{m(n-m)/n})n)/n \quad (15)$$

And the high probability is calculated from:

$$p_H = (m + d\sqrt{m(n-m)/n})/n \quad (16)$$

where d=2 for 95% confidence (Equations 15 and 16 are derived from equations 5 and 6).

In step S37 the probability values $p_L(t|l)$, $p_B(t|l)$ and $p_H(t|l)$ as shown in step S33, S35 or S36 are divided respectively by $p_L(t)$, $p_B(t)$ and $p_H(t)$ calculated in steps S26 or S27.

In step S39 the probabilities $p_B(t|l)$, $p_L(t|l)$ and $p_H(t/l)$ are calculated for a word token when m=0 using:

$$p = \frac{1 - \sqrt[n]{0.95}}{p(t)} \quad (17)$$

Using p(t) for M=0.

In step S40 the probabilities are then stored in a table and in step S42 the training procedure is terminated.

Although in FIGS. 6b and 6c specific values for M and m are used to determine the frequency range for the probability calculations, any suitable value can be chosen. As can be seen in FIG. 6c in step S34 the value set for m as the threshold for the high frequency range is 100000. Thus in practice the high frequency range calculations are not used. However, there may be cases were computational cost is at a premium and in this case the high frequency calculation may be applied for the tokens with a reduced frequency.

Although in FIGS. 6a, 6b and 6c a specific training procedure has been described, variations are possible. Firstly, it is not essential to apply the binomial distribution. It is suitable for the data in the language identification problem based on the assumption that the tokens are to be treated as independent events. For other situations where a similar classifier is applied, other probability distributions might be more appropriate. The key points are to compute a confidence range and to switch from an approximate estimation to a more exact one when required by the characteristics of the distribution.

Secondly, the same procedure can be used to compute confidence intervals for the overall distribution p(t) rather than just the base probabilities described above. The Bayes' Rule calculation would then have to take the range for both p(t) and p(t|l) into account.

Finally, other methods of estimating probabilities could be used. One possibility is Good-Turing estimation, which is designed specifically to correct the estimates of frequency of occurrence to allow for the fact that the training data is a sample. A practical implementation of the technique call 'Simple Good Turing' (SGT) is described in detail in a paper entitled 'Good Turing Estimation without Tears' by W A Gale and G Samson (Journal of Quantitative Linguistics, Vol 2, Part 3 pages 217 to 237) and some related possibilities for solving similar problems are also considered in this paper. SGT could be used to smooth the m values before performing the calculations illustrated above.

The result of the training data is a lexicon for each language. A lexicon comprises a look-up table listing all of the tokens which are known for a language together with the probabilities of each token appearing in the language. There is also a zero probability which is used for any tokens which are not present in the training data for the given language. The probability range from the minimum to the maximum around the base value allows for the fact that the training data is a sample of the language rather than a complete description of it.

Various embodiments for language identification will now be described with reference to FIGS. 7 to 14.

Figure 7:
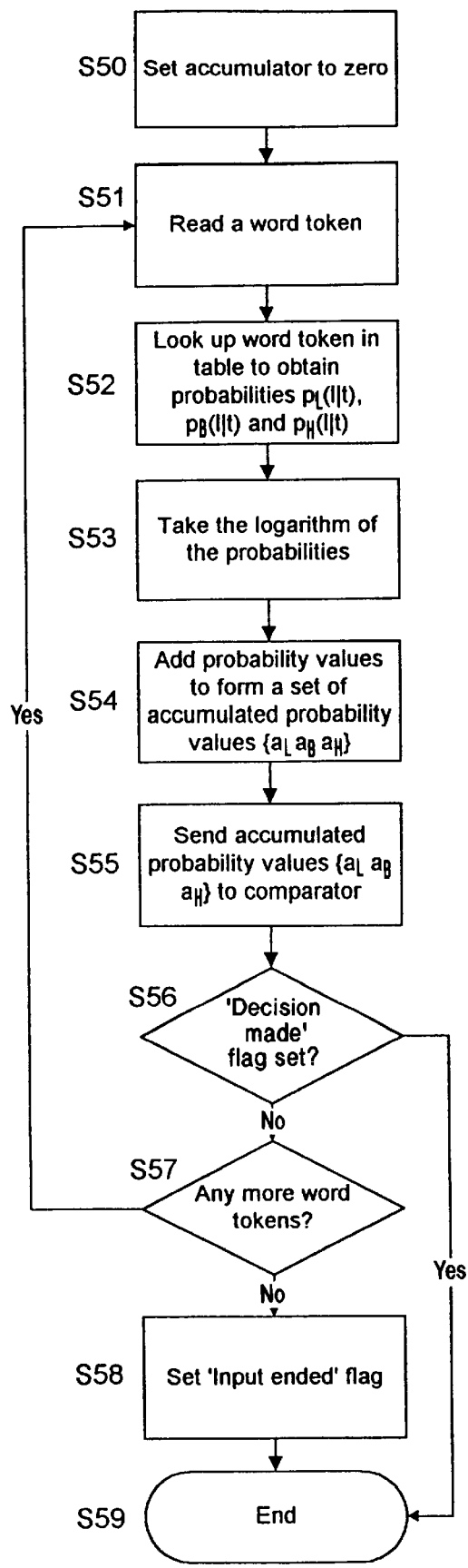
FIG. 7 is a flow diagram of the operation of the lexicons and accumulators of FIG. 5 in accordance with one embodiment of the present invention.
Figure 8:
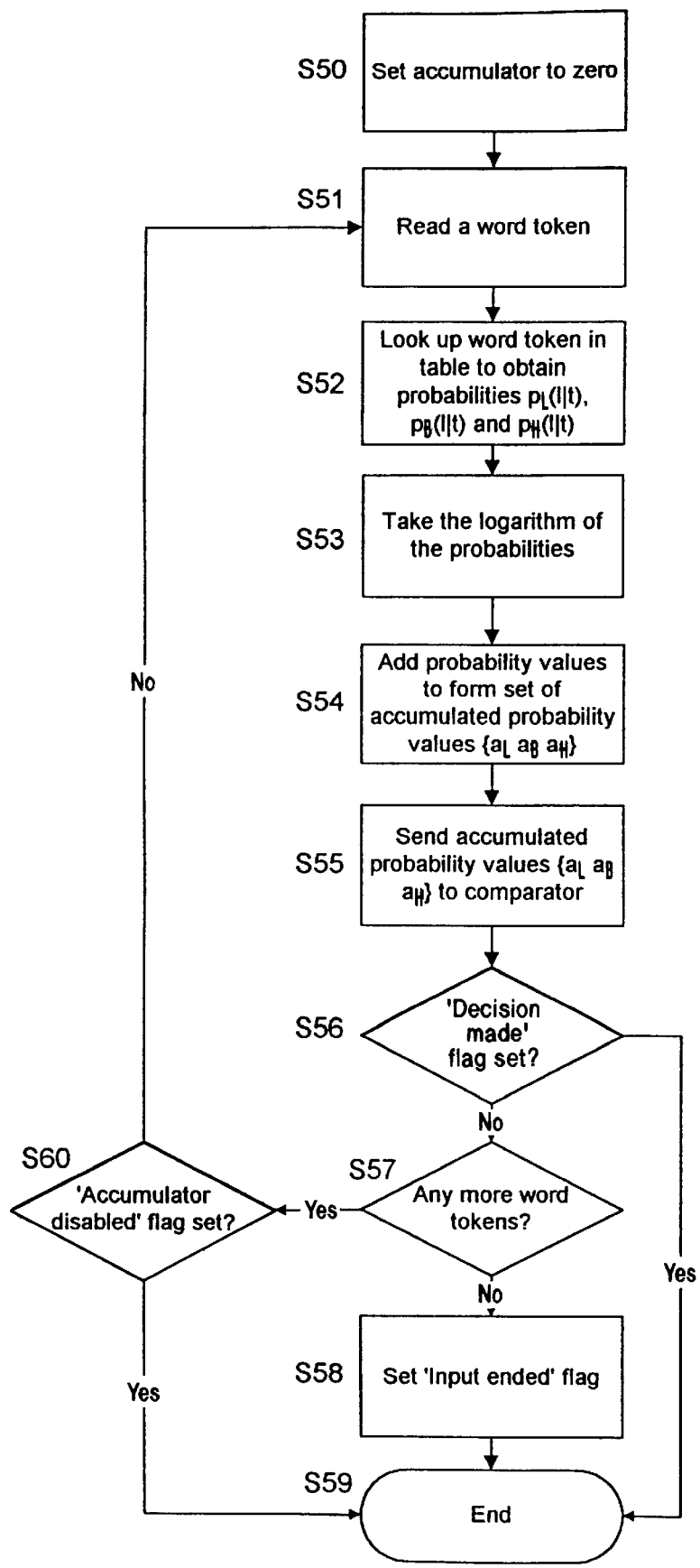
FIG. 8 is a flow diagram of the operation of the lexicons and accumulators of FIG. 5 in accordance with another embodiment of the present invention.

FIGS. 7 and 8 illustrate alternative methods of obtaining accumulated probability values for input to the comparator. In step S50 the accumulator is initially zeroed and in step S51 a word token is read. In step S52 the word token is looked up in the lexicon to obtain the probabilities $p_L(l|t)$, $p_B(l|t)$ and $p_H(l|t)$. In step S53 the logarithm of the probabilities taken and in step S54 the probability values are added to form a set of accumulated probability values $\{a_L\ a_B\ a_H\}$ for each language. In step S55 the accumulated probability values $\{a_L\ a_B\ a_H\}$ are sent to the comparator. In step S56 it is determined whether the 'decision made' flag has been set. If a decision has been made and a flag has been set then the process terminates in step S59. If a decision has not been made and the flag has not been set in step S57 it is determined whether there are any more word tokens for input. If there are more word tokens then the process returns to step S51 to continue the accumulation process. If there are no more word tokens in step S58 the 'input ended' flag is set and the process terminates in step S59.

The steps of FIG. 8 differ from FIG. 7 in that additional step S60 is provided. In the flow of FIG. 8 in step S57 if there are more word tokens to be read in step S60 it is determined whether the 'accumulator disabled' flag has been set. This can be set as will be described hereinafter with reference to FIG. 12 for languages which are unlikely to be languages to which the word tokens belong. If the accumulator disabled flag has been set the process terminates in step S59 otherwise more word tokens can be read in step S51.

FIGS. 9 to 13 illustrate alternative methods of operation of the comparator to identify the language from the output of the accumulators.

Figure 9:
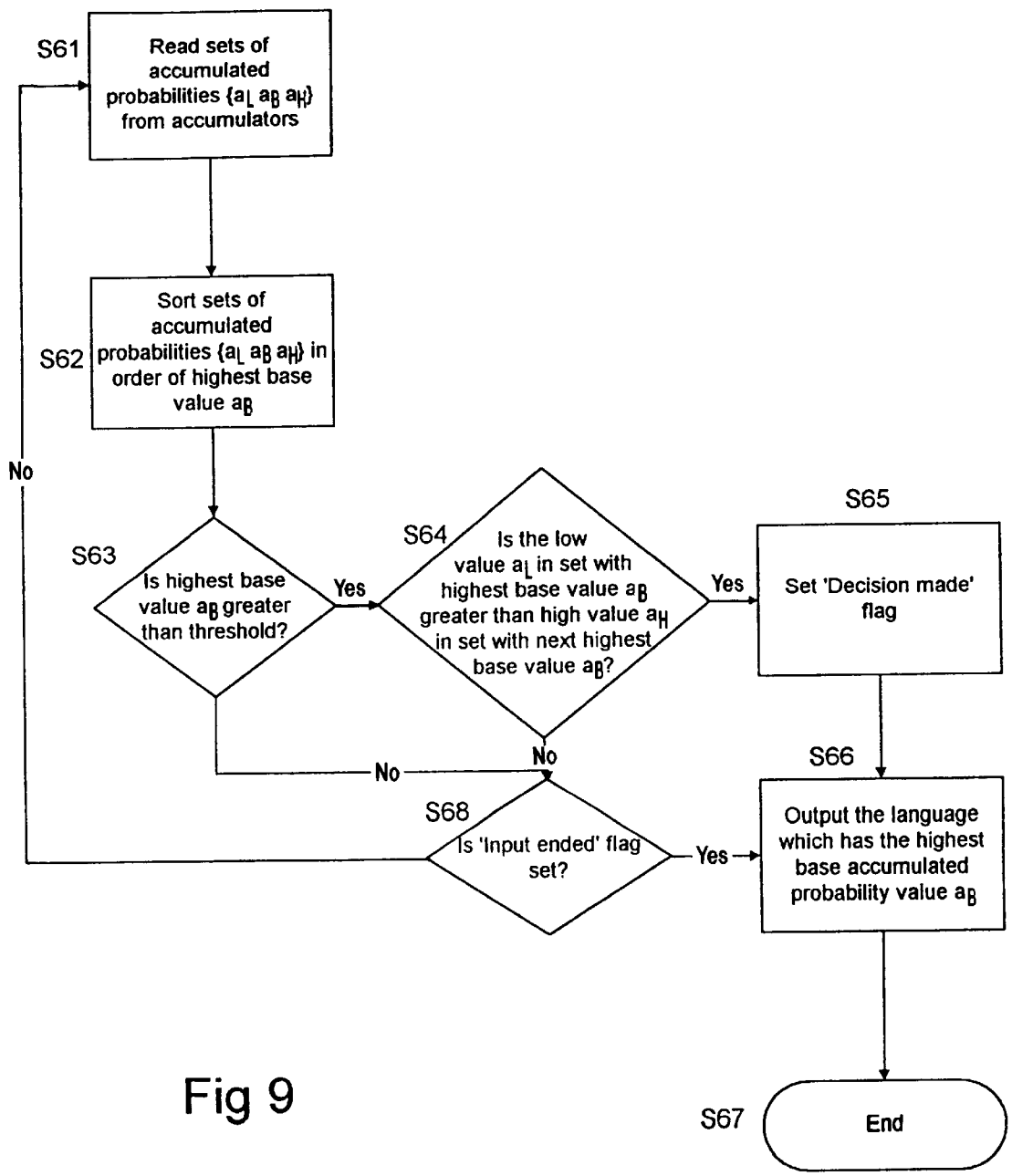
FIG. 9 is a flow diagram of the operation of the comparator of FIG. 5 in accordance with a first embodiment of the present invention.

In FIG. 9, and in step S61 sets of accumulated probabilities $\{a_L\ a_B\ a_H\}$ are read from the accumulators. In step S62 the sets of accumulated probabilities $\{a_L\ a_B\ a_H\}$ are sorted in order of the highest base value $a_B$. In step S63 it is determined whether the base value is greater than the threshold. If the highest base value is greater than the threshold in step S64 it is determined whether the low value $a_L$ in the set with the highest base value $a_B$ is greater than the high value $a_H$ in the set of the next highest base value $a_B$. If so in step S65 the 'decision made' flag is set and in step S66 the language which has the highest base accumulated probability value $a_B$ is output and the process terminates in step S67. If in step S64 it is determined that the low value $a_L$ in the set with the highest base value $a_B$ is not greater than the high value $a_B$ in the set with the next highest base value $a_B$ in step S68 it is determined whether the 'input ended' flag has been set. If so in this method the language which has the highest base accumulated probability value $a_B$ can still be output at step S66. If the 'input ended' flag has not been set then the process returns to step S61 to read the sets of accumulated probabilities $\{a_L\ a_B\ a_H\}$. If in step S63 it is determined that the highest base value of $a_B$ is not greater than the threshold in step S63 it is determined whether the 'input ended' flag has been set and if so the language which has the highest base accumulated probability value $a_B$ can be output in step S66 or otherwise the process can return to step S61.

Although the process of FIG. 9 is possible, this process does not benefit from preventing the output of a language when there is an overlap in probability with another language i.e. the language of the highest base probability is not distinctive.

Figure 10:
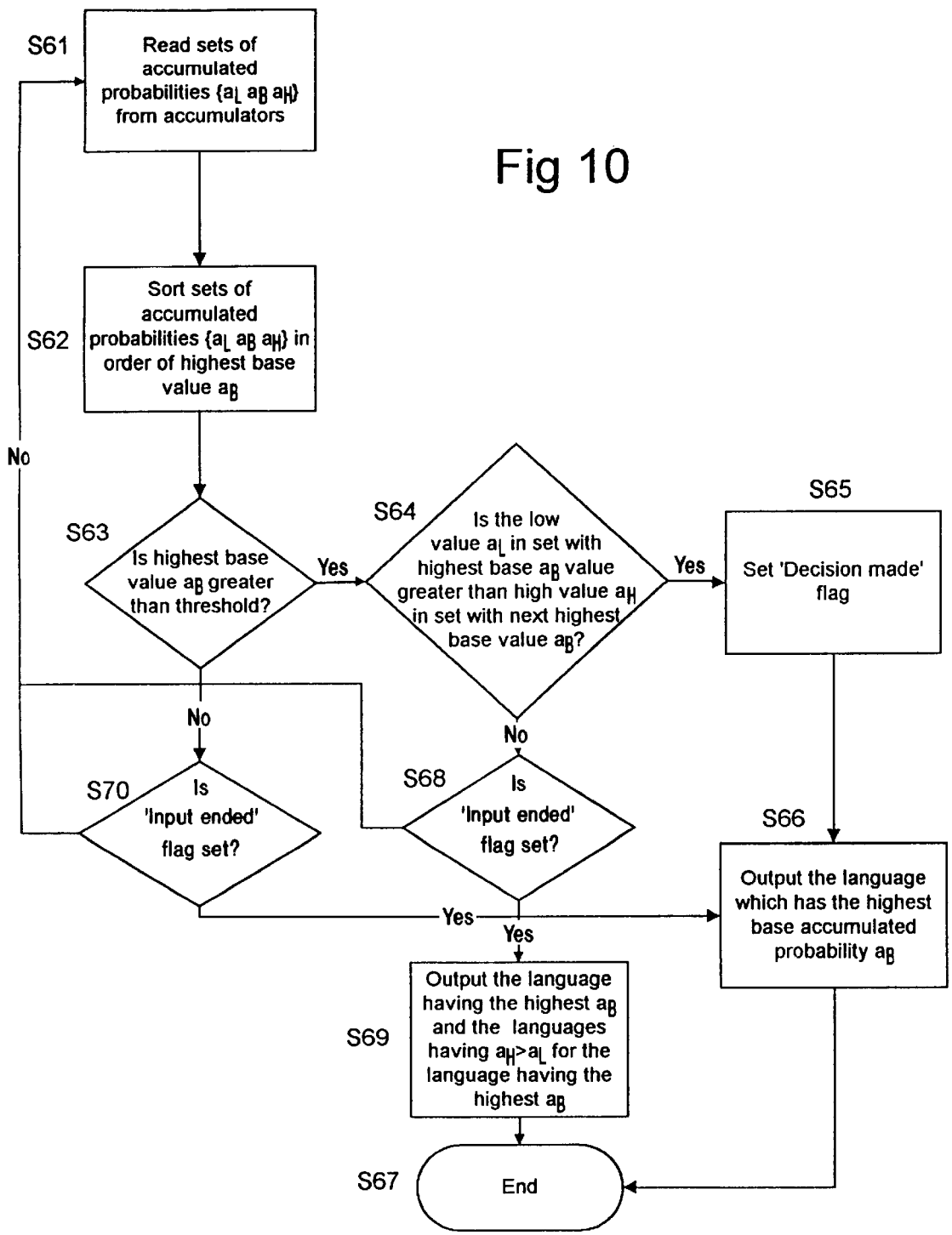
FIG. 10 is a flow diagram of the operation of the comparator of FIG. 5 in accordance with a second embodiment of the present invention.

In FIG. 10 if the threshold is exceeded but there is still overlap between the probabilities and the 'input ended' flag is set in step S68, in step S69 the language having the highest base value $a_B$ and the languages having a high value greater than the low value for the language having the highest base value $a_B$ can be output.

Figure 11:
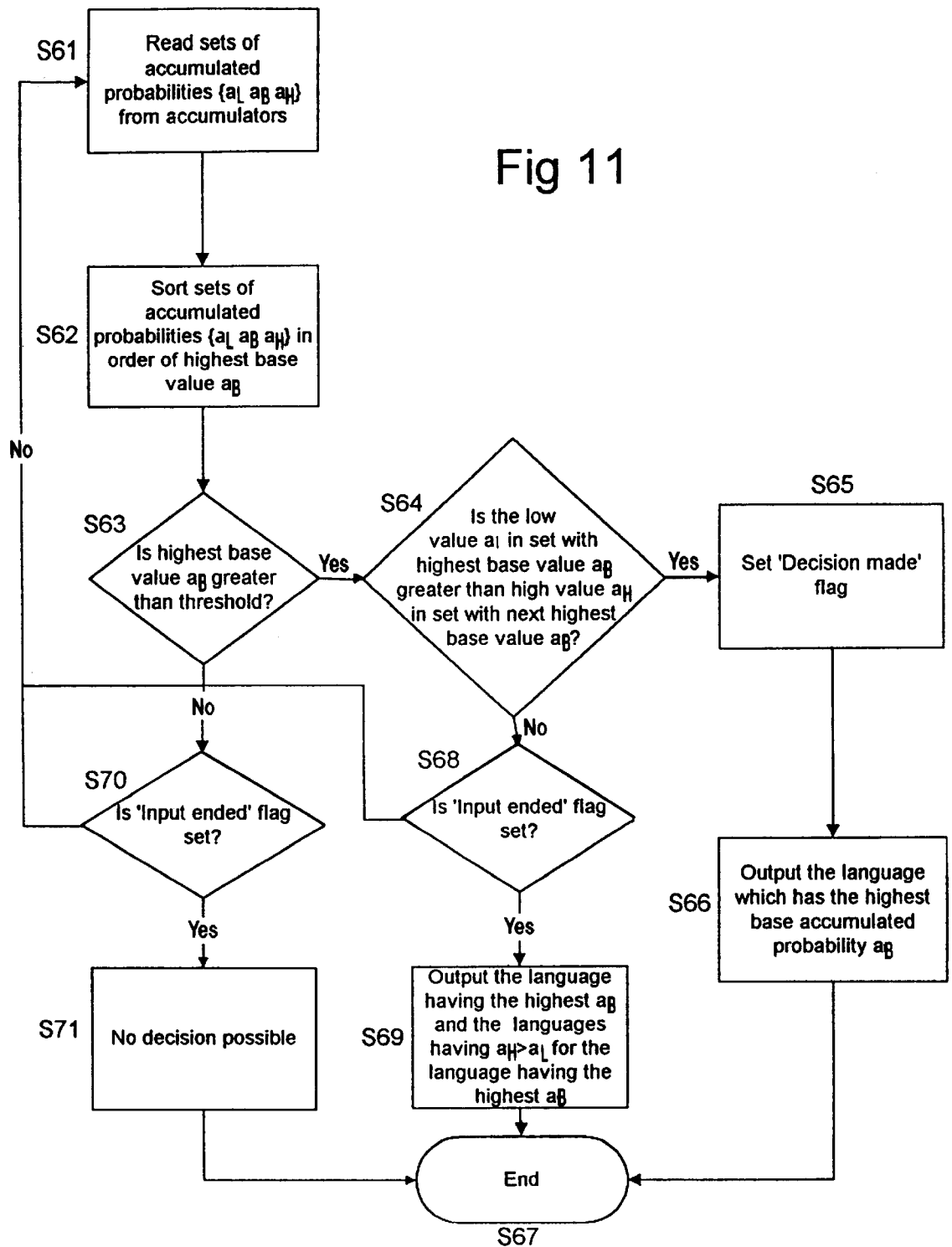
FIG. 11 is a flow diagram of the operation of the comparator of FIG. 5 in accordance with a third embodiment of the present invention.

FIG. 11 illustrates a preferred method wherein if the threshold has not been exceeded in step S63 and the 'input ended' flag is set in step S70 no decision is possible in step S71 and the process terminates in step S67. If the threshold is exceeded in step S63 and in step S64 there is overlap between the probabilities of the languages and if in step S68 the 'input ended' flag is set, in step S69 the language having the highest base value $a_B$ and the languages having a high value $a_H$ greater than the low value $a_L$ for the language having the highest base value $a_B$ are output. If the threshold is exceeded in step S63 and there is no overlap indicated in step S64, in step S65 the 'decision made' flag is set and in step S66 the language which has the highest base accumulated probability $a_B$ is output as the identified language.

In this embodiment of FIG. 11 no language can be identified until at least the threshold is exceeded. If at the end of the input data there is still overlap between the accumulated probability values of one or more languages, these languages can be output to allow a user to select a language from the output languages manually. If on the other hand the threshold is exceeded and there is no overlap of the probabilities, a language can be identified.

Figure 14A:
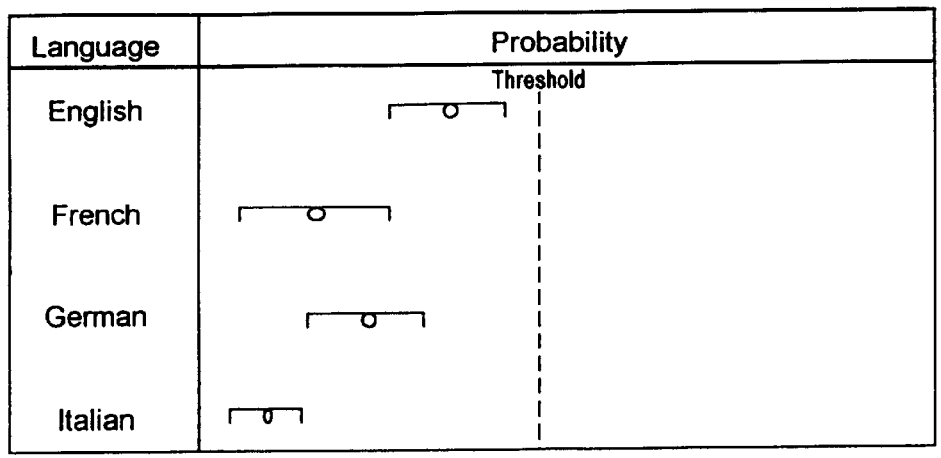
FIG. 14a is a schematic drawing of accumulated probability values for language identification wherein a threshold has not yet been exceeded and no unique language is identifiable.
Figure 14B:
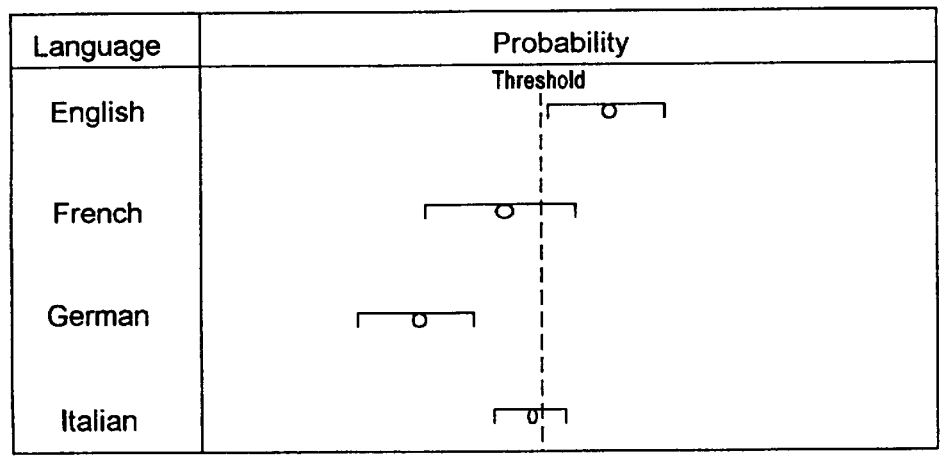
FIG. 14b is a schematic drawing of accumulated probabilities for language identification wherein the probability for one language has exceeded the threshold but no unique language is identifiable.
Figure 14C:
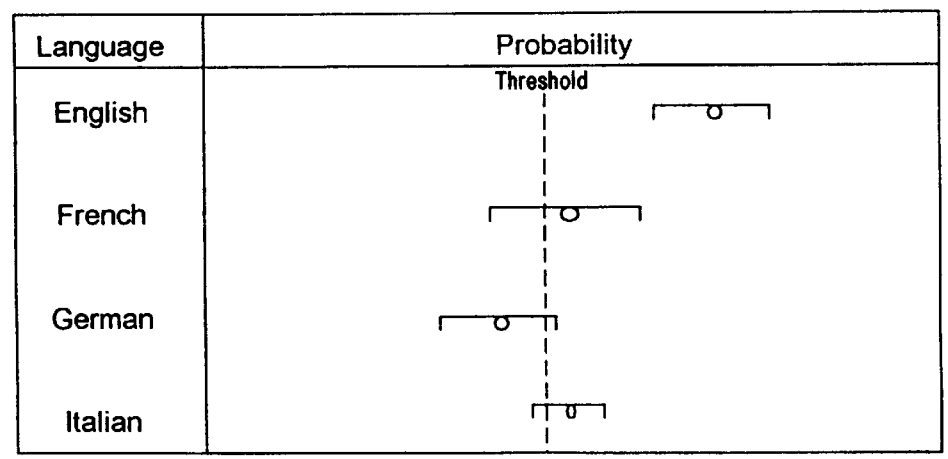
FIG. 14c is a schematic drawing of accumulated probabilities for language identification wherein the threshold has been exceeded and a unique language is identifiable.

FIGS. 14a, 14b and 14c diagrammatically illustrate the process during sequential reading of word tokens from OCR data which can be in any one of four languages (English, French, German or Italian). In FIG. 14a the accumulated probabilities have not reached the threshold and thus no language is identified. In FIG. 14b it can be seen that the probability of the language being English has exceeded the threshold but there is still overlap with the probability for the languages being French and Italian. If there is no more data these three languages could be identified as possible languages to which the input data belongs. In FIG. 14c it can be seen that the probability for the English language is now separate from the probabilities for the other languages and therefore the English language can be identified as the language to which the input data belongs.

Figure 12:
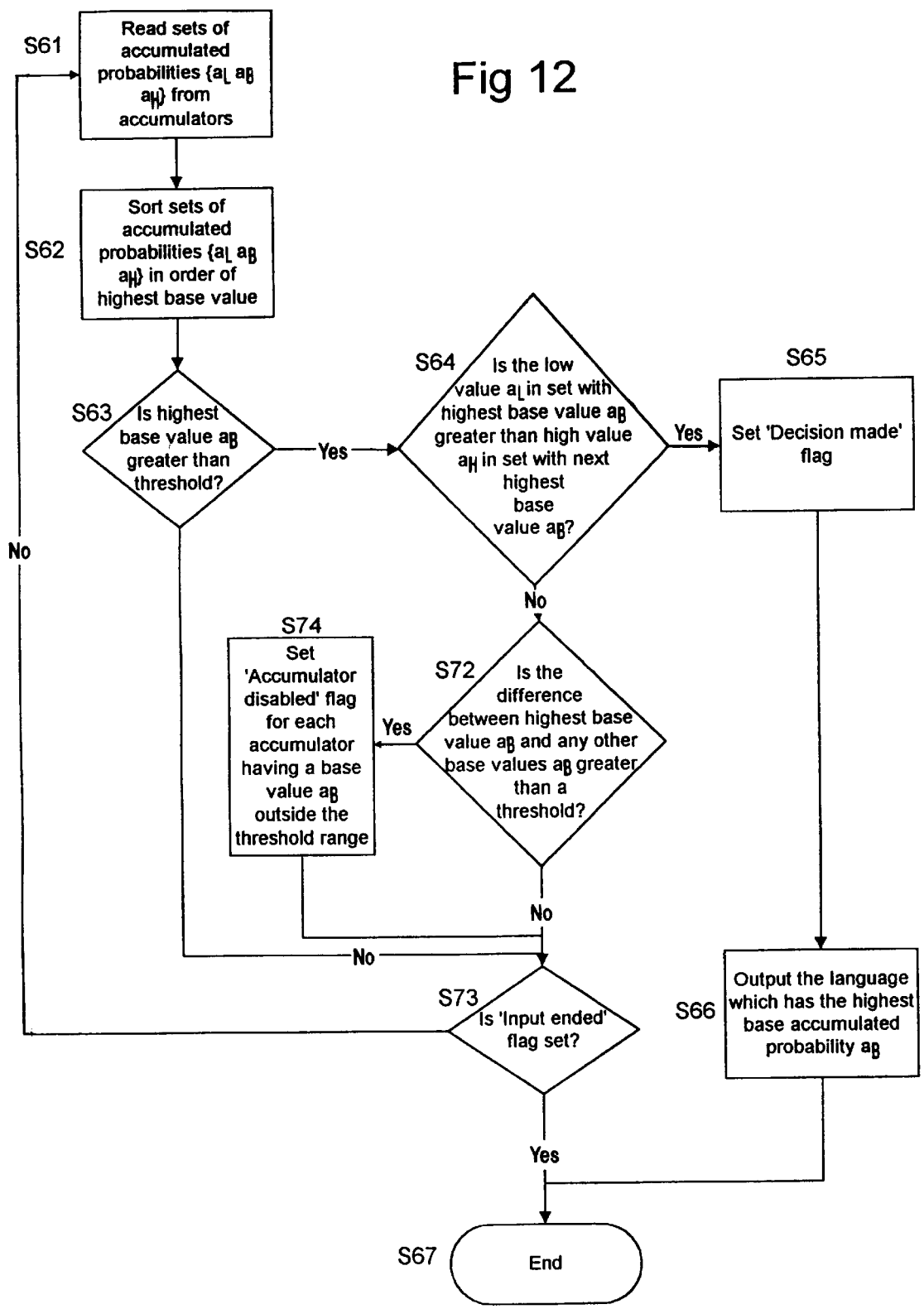
FIG. 12 is a flow diagram of the operation of the comparator of FIG. 5 in accordance with a fourth embodiment of the present invention.

FIG. 12 illustrates an alternative embodiment wherein if the threshold is determined to be exceeded in step S63 but in step S64 the probabilities are not distinctive, in step S72 it is determined whether the difference between the highest base value $a_B$ and any other base values $a_B$ and any other base values $a_B$ is greater than a threshold. If so in step S74 the 'accumulator disabled' flag is set for the accumulators having a base value $a_B$ outside the threshold range. In this way when several languages become the most likely, the accumulators for the least likely languages are disabled thereby effectively removing them from contention. This therefore reduces the processing requirements since accumulation is only required for the most likely languages.

Figure 13:
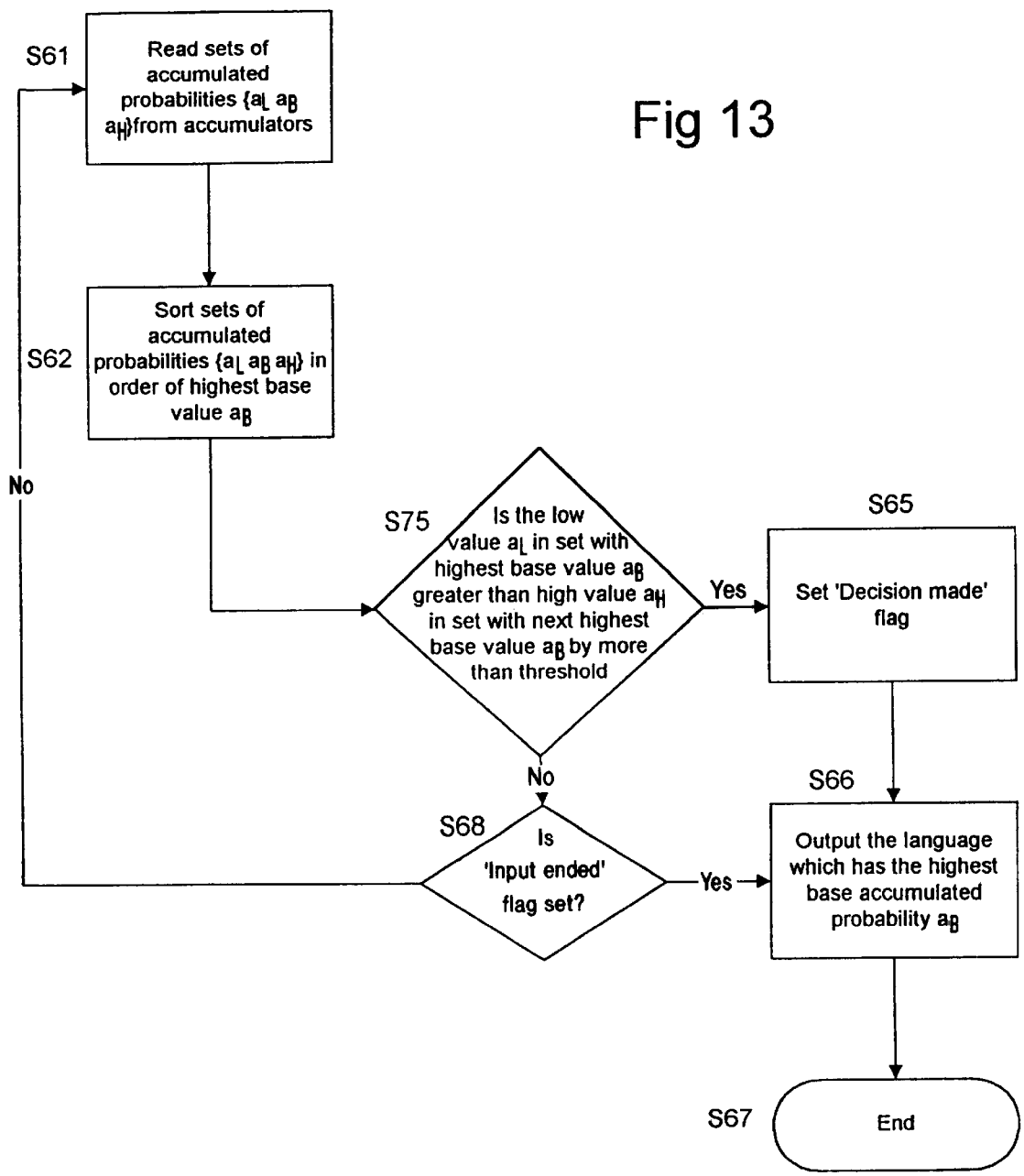
FIG. 13 is a flow diagram of the operation of the comparator in accordance with a fifth embodiment of the present invention.

In FIGS. 9 to 12 in step S63 the threshold used is an absolute threshold. However, the threshold can be a relative threshold as illustrated in FIG. 13. In FIG. 13 in step S75 it is determined whether the low value $a_L$ in the set with the highest base value $a_B$ is greater than the high value $a_H$ in the set with the next highest base value $a_B$ by more than a threshold amount. If so then in step S65 the 'decision made' flag is set and in step S66 the language which has the highest base accumulated probability $a_B$ is output.

Thus, FIG. 13 is similar in structure to FIG. 9 except for the replacement of steps S63 and S64 with step S75. The steps FIG. 13 could also be modified in a manner similar to FIG. 10 in that the positive output of step S68 could be input to step S69 i.e. if the data is ended the language having the highest base value $a_B$ and the languages having a high value $a_H$ greater than the low value $a_L$ for the language having the highest base value $a_B$ are output. Alternatively, the positive output of step S68 could result in step S71 i.e. no decision is possible.

Thus, there are many different ways in which either an absolute or differential threshold can be set and as a result can either be no decision or an identification of the language or an identification of several possible languages which allows a user to manually select a language.

In an experimental evaluation of the technique samples of eighteen languages were extracted from the European Corpus Initiative CD ROM 1 and divided into files containing between 1 and 2000 lines of text, distributed as one file of 2000 lines, one of 200 lines, and 25 files each of 1, 5, 10 and 20 lines. The 2000 and 200 line files were used as training data and the remainder as test data. The text in the files was mapped to word shaped tokens using the same mapping as in the Sibun & Reynar technique to simulate the tokens extracted from a scanned image. Tokens were defined as sequences of characters separated by white space characters. This leads to punctuation being treated as part of the word, when it immediately follows it, and provides some simulation of noise in the data. The identification algorithm was run on each test file and the results placed in one of four categories:

1. A definitive, correct decision on a single language;
2. No definitive decision on a language, but the one with the highest scare at the end of the input being the correct one;
3. No definitive decision, with the highest scoring language at the end not being the correct one; and
4. A definitive, but incorrect decision on a single language.

Comparing the sum of the first two figures to the total number of tests gives a figure for the accuracy. Comparing the sum of the first and last figures to the total gives a figure for the recall i.e. number of tests where a definitive decision was reached.

Figure 15:
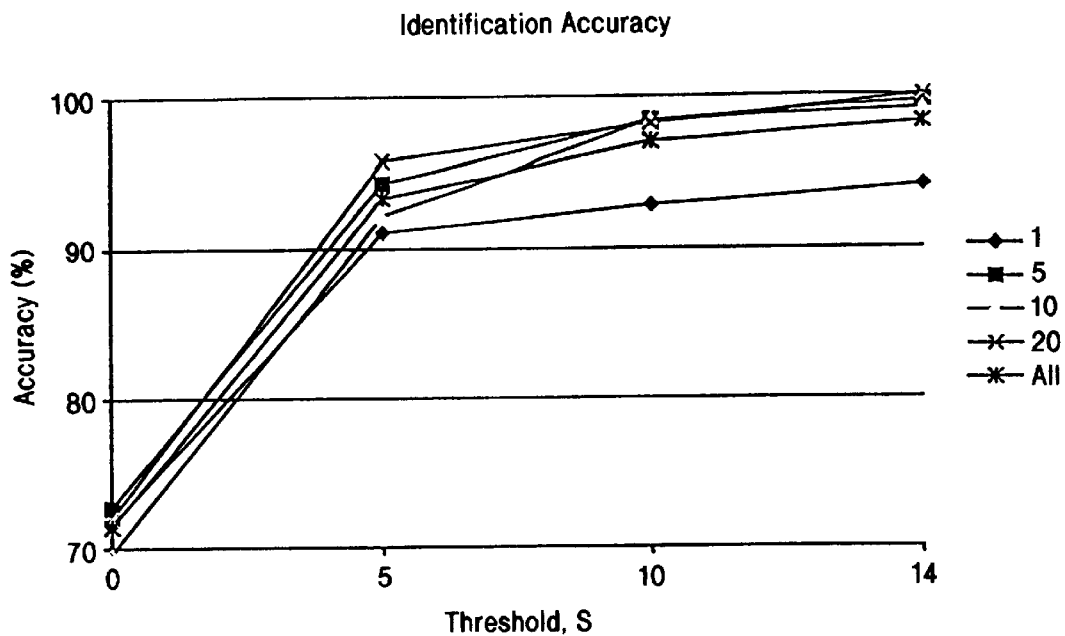
FIG. 15 is a graph illustrating the identification accuracy with variation in threshold for different sets of test data.
Figure 16:
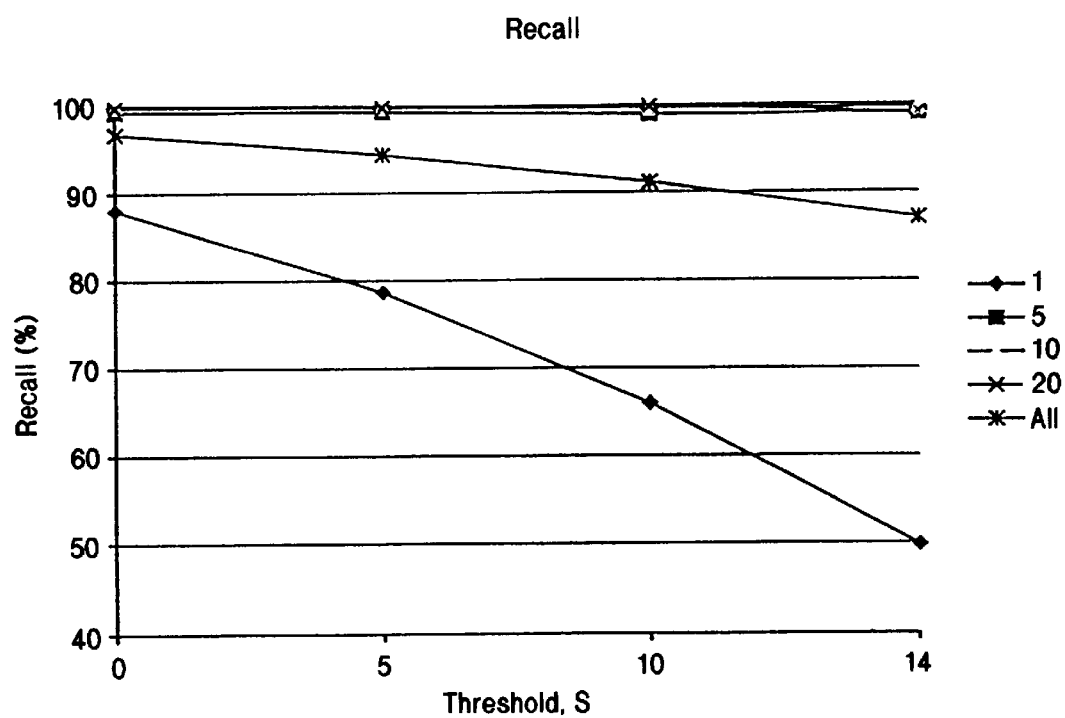
FIG. 16 is a graph illustrating the ability of the system to identify a language with variation in threshold for different sets of test data.
Figure 17A:
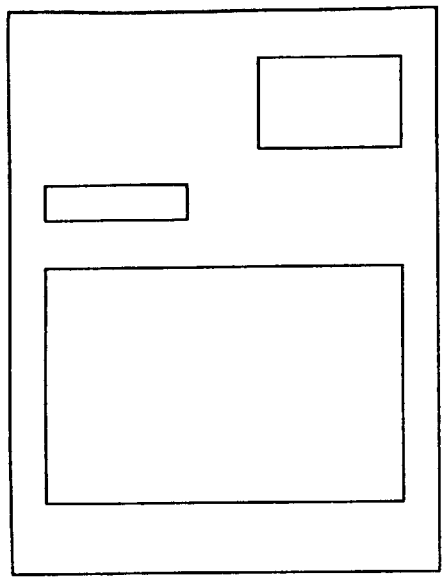
FIGS. 17a to 17d are schematic illustrations of four different layouts of text on a document page.
Figure 17B:
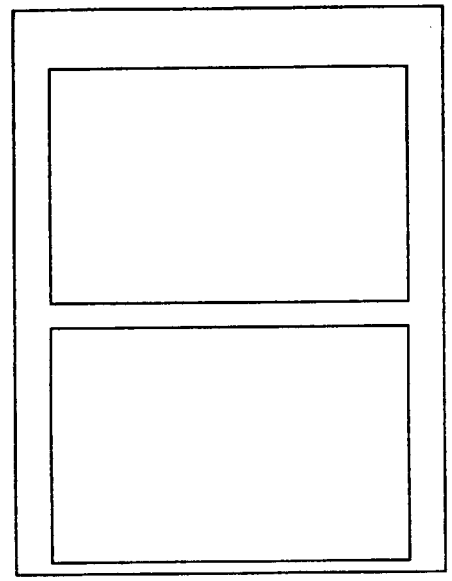
Figure 17C:
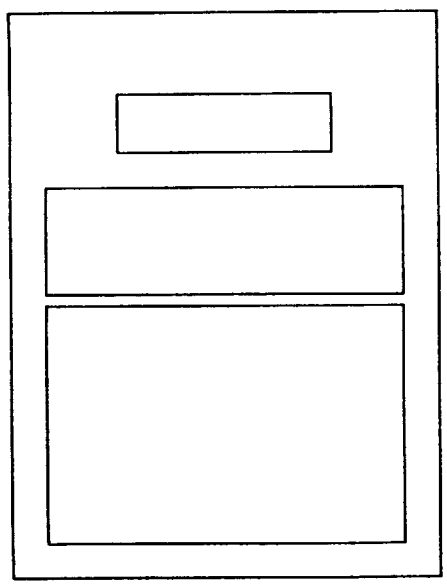
Figure 17D:
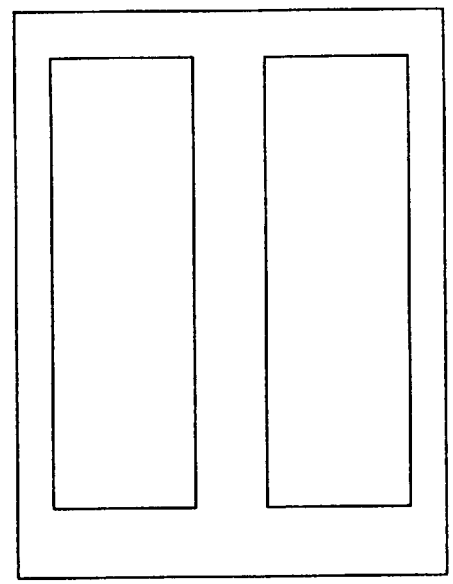

The results are shown in Tables 1 and 2 and FIGS. 15 and 16 for data having 1, 5, 10, 20 and all lines of text for a threshold S of 0, 5, 10 and 14.

TABLE 1

| | | Identification accuracy % | | | |
|---|---|---|---|---|---|
| S | 1 line | 5 lines | 10 lines | 20 lines | All |
| 0 | 71.6 | 72.7 | 69.6 | 72.0 | 71.4 |
| 5 | 91.1 | 94.4 | 92.2 | 95.8 | 93.4 |
| 10 | 92.9 | 98.4 | 98.4 | 98.2 | 97.0 |
| 14 | 94.2 | 99.6 | 99.1 | 100 | 98.2 |

TABLE 2

| | | Recall (%) | | | |
|---|---|---|---|---|---|
| S | 1 line | 5 lines | 10 lines | 20 lines | All |
| 0 | 88.0 | 99.3 | 100 | 99.8 | 96.8 |
| 5 | 78.7 | 99.3 | 99.8 | 99.8 | 94.4 |
| 10 | 66.0 | 98.9 | 99.6 | 99.8 | 91.1 |
| 14 | 49.8 | 98.9 | 99.6 | 99.8 | 87.0 |

It can be seen from the tables and from the graphs that increasing the threshold S increases the accuracy but decreases the recall. Therefore an optimum value for S needs to be chosen which provides for a reasonable accuracy for the likely length of data to be input whilst still providing for the high percentage recall.

It can thus be seen from the description of the foregoing embodiments that the present invention is particularly suited for the identification of a language for OCR data. This approach is however equally valid for speech recognition data. What is required is the extraction of the features of the data to provide elements or tokens which can be sequentially input into the system.

The technique can be applied directly to the text in computer readable form e.g. ASCII. Such text can either be compression coded to reduce the number of inputs to compress the probability distribution or they can be directly input as elements into the system. In other words the input to the system could simply comprise words in ASCII and the lexicons will comprise tables of words and their probabilities of occurrence in the language.

The features or elements of the data that are to be used as the input system need to be identified as features or elements that will give good determination.

In the present invention the elements must be input sequentially but the order of sequential input of the elements is not important.

Although in previous embodiments the lexicons comprise lexicons for languages, the lexicons could equally comprise lexicons for subjects e.g. poetry, law or science to thereby allow text to be classified into subject matter classifications. This can allow software to use different libraries for different subjects. Also, different areas of the document can be processed using different libraries.

Another embodiment of the present invention will now be described with reference to FIGS. 17 and 18. This embodiment is directed towards document type identification by identifying the shape or layout of text in the document. FIGS. 17a to 17d illustrate different arrangements of passages of text on documents. Passages of text can simply be coded for instance by their position on a page. For example, simple elements can be used right, left and centre (R, L, C) to denote the position of the passage of text. Thus FIG. 17a could be coded as R, L, C, FIG. 17b as C, C, FIG. 17c as C, C, C and FIG. 17d as L, R.

The document formed of many pages can thus be identified by simple document page codes. For example FIG. 17a would be typical of the layout of a letter.

Figure 18:
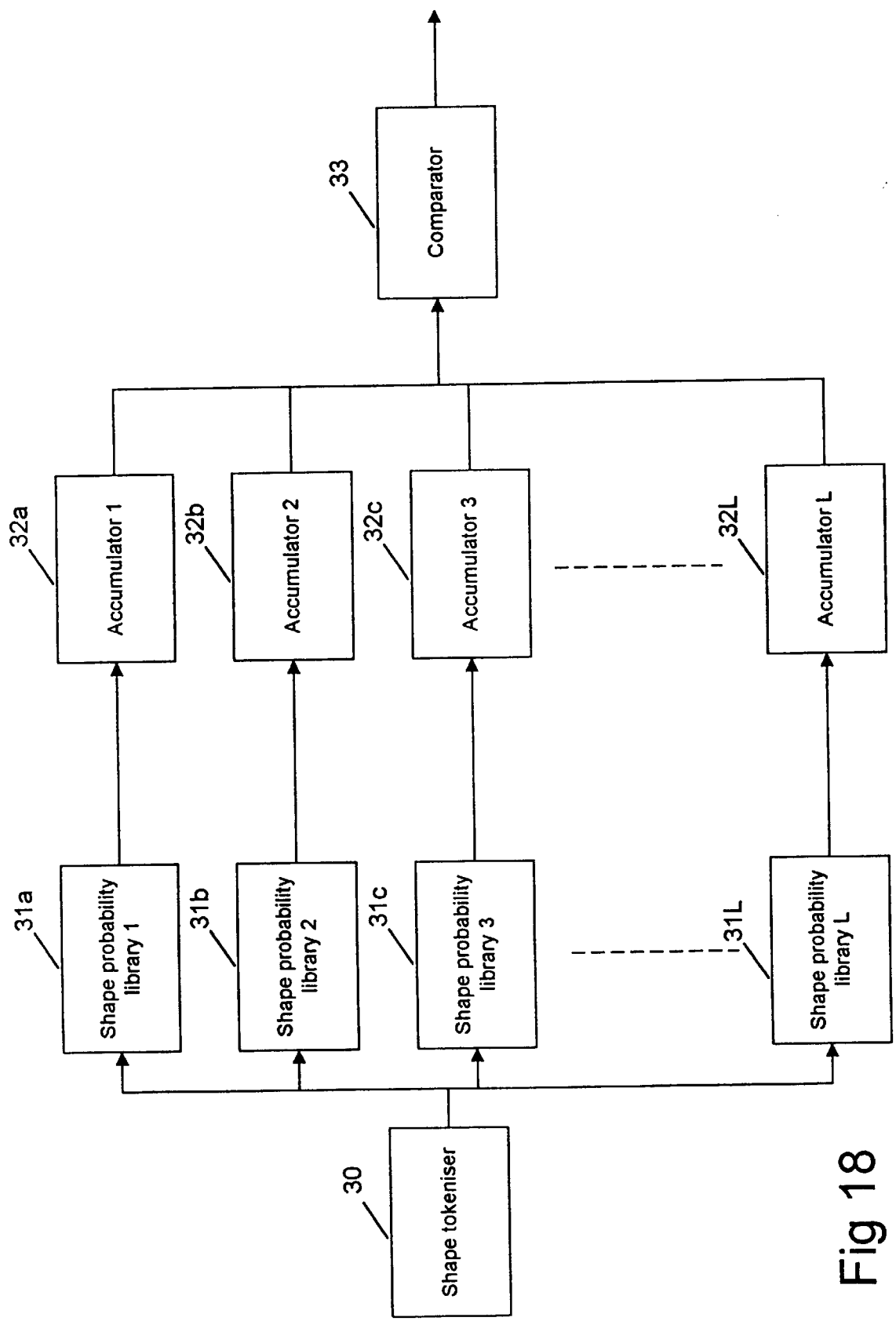
FIG. 18 is a schematic functional diagram of a document identification system.

FIG. 18 is a functional diagram of a document recognition system in accordance with one embodiment of the present invention. The features of the documents are extracted by the shape tokeniser 30 to generate shape tokens which are input to the shape probability libraries 31a,31b,31c . . . 31L. The shape probability libraries 31a,31b,31c . . . 31L contain tables of predetermined probabilities for shape tokens. The probabilities for each shape token are fed from the shape probability library 31a,31b,31c . . . 31L to respective accumulators 32a,32b,32c . . . 32L wherein the probabilities are accumulated. The accumulated probabilities are then output from the accumulators 32a,32b,32c . . . 32L to the comparator 33 wherein the accumulated probabilities are compared to determine whether a document classification can be identified. The training processes and the identification processes described with reference to language identification of OCR data can be equally applied to document identification.

As can be seen from the description of the embodiments hereinabove, the present invention is applicable to the processing of data for the identification of a classification to which data belongs wherein the data comprises a number of features at least one of which can be found in each of the classifications.

Although the present invention has been described hereinabove with reference to specific embodiments it will be clear to a skilled person in the art that modifications are possible within the scope of the present invention as defined by the appended claims.

What is claimed is:

1. A data processing method for identifying a classification to which data belongs, the data comprising a plurality of features at least some of which are common to a plurality of classifications, the method comprising the steps of:

extracting the features of the data as sequential elements and sequentially inputting the sequential elements or groups of elements until the classification to which data belongs is identified;

for each element or group of elements, comparing the element or group of elements with predetermined probability values for elements or groups of elements of each classification to determine a probability with a specified confidence range that the element or group of elements belong to a classification;

accumulating the probabilities to form an accumulated probability for each classification; and identifying a classification to which the data belongs from the accumulated probability if the accumulated probability reaches a predetermined probability threshold, and the accumulated probability for the classification is greater than the accumulated probabilities of each of the other classifications by a predetermined amount.

2. A method according to claim 1 including the step of outputting the identified classification.

3. A method according to claim 2 including the step of outputting the accumulated probability for the identified classification.

4. A method according to claim 2 wherein the output identified classification is used for the further processing of data.

5. A method according to claim 4, wherein data belonging to different classifications requires processing differently and the output identified classification is used to select the processing to be carried out on the data.

6. A method according to claim 1 wherein if the accumulated probabilities of the classification do not reach the predetermined probability threshold, several of the classifications having the highest accumulated probabilities are identified as possible classifications to which the data belongs.

7. A method according to claim 6, wherein a user manually selects a classification from among the possible classifications.

8. A method according to claim 1 wherein each of the probabilities and accumulated probabilities comprise a minimum likely value for the probability within a predetermined confidence range, a maximum likely value for the probability within a predetermined confidence range and a base value for the probability which is the most likely value, and a classification is identified as the classification to which the input data belongs if the base value of the accumulated probability for the classification reaches said predetermined probability threshold.

9. A method according to claim 8 wherein if the minimum likely value of the accumulated probability for the classification having the highest base value is not greater than the maximum likely value of the accumulated probabilities of each of the other classifications, the classifications having the maximum likely values of the accumulated probabilities which are greater than the minimum likely values of the classification having the highest base value are identified as possible classifications to which the data belongs.

10. A method according to claim 9, wherein each of the minimum and maximum likely values of the probabilities are calculated as being two or more standard deviations from the base values of the accumulated probabilities.

11. A method according to claim 1 wherein each of the probabilities and accumulated probabilities comprise a minimum likely value for the probability within a predetermined confidence range, a maximum likely value for the probability within a predetermined confidence range, and a base value for the probability which is the most likely value; and a classification is identified as the classification to which the input data belongs if the base value of the accumulated probability for the classification reaches said predetermined probability threshold and the minimum likely value of the accumulated probability for the classification is greater than the maximum likely values of the accumulated probabilities of each of the other classifications.

12. A method according to claim 11, wherein if the base values of the accumulated probabilities for the classifications do not reach said predetermined probability threshold, several of the classifications having the highest base values of the accumulated probabilities are identified as possible classifications to which the data belongs.

13. A method according to claim 1 wherein a classification is identified as a classification to which the data belongs if the accumulated probability is greater than the accumulated probability of each of the other classifications by a predetermined amount.

14. A method according to claim 13 wherein if the highest accumulated probability is not greater than each of the other accumulated probabilities by said predetermined amount, several of the classifications having the highest accumulated probabilities are identified as possible classifications to which data belongs.

15. A method according to claim 13 wherein each of the probabilities and accumulated probabilities comprise a minimum likely value for the probability within a predetermined confidence range, a maximum likely value for the probability within a predetermined confidence range, and a base value for the probability which is the most likely value; and a classification is identified as the classification to which the data belongs if the base value of the accumulated probability for the classification is greater than the base values of the accumulated probabilities of the other classifications.

16. A method according to claim 1 wherein said sequential elements are input as groups of sequential elements.

17. A method according to claim 1 wherein the step of extracting the features comprise the step of coding the features of the as data sequential elements.

18. A method according to claim 17 wherein the coding step comprises coding to generate a reduced number of different elements compared with the number of different features in the data.

19. A method according to claim 1 wherein the step of extracting the features comprises identifying each element in the data which comprises a feature.

20. A method according to claim 1 including the preliminary steps to determine said predetermined probability values of:
   a) extracting the features of training data representative of a known classification as sequential elements and sequentially inputting the sequential elements,
   b) calculating probability values for the sequential elements, and
   c) storing the calculated probability values, and repeating steps a to c for each classification.

21. A method according to claim 20 wherein the step of calculating the probability values for the sequential elements or groups of elements includes determining the frequency of occurrence of each element or group of sequential elements.

22. A method according to claim 20 wherein the probability values are calculated using Bayes Rule such that the probability values are given by:

$$p(l|t) = \frac{p(t|l) \cdot p(l)}{p(t)}$$

where:
   p(l|t) is the probability of the classification given the element or groups of elements
   p(t|l) is the probability of the element given the classification
   p(l) is the probability of the classification
   p(t) is the probability of the element or group of elements.

23. A method as claimed in claim 20 wherein the step of calculating the predetermined probability values for the sequential elements includes the steps of calculating the probability of the occurrence of an element or group of elements in the data input for all of the classifications, setting the probability of the occurrence of the classification to a preset level, and calculating the probability of an element occurring in a classification.

24. A method as claimed in claim 23 wherein the probability of the occupance of a classification is the same for all classifications and is therefore ignored in the calculations.

25. A method according to claim 20 wherein the predetermined probability values comprise a minimum likely value for the probability, a maximum likely value for the probability and a base value for the probability which is the most likely value, the minimum and maximum likely values being calculated as probability values lying within a predetermined confidence range of the base value.

26. A method according to claim 20 wherein the step of calculating values including the step of calculating probability values for each classification for elements or groups of elements which do not occur in the training data.

27. A method of sorting data comprising the data processing method for identifying a classification to which the data belongs in accordance with claim 1, and the step of sorting the data in accordance with the identified classification.

28. A method of processing data comprising the method for identifying a classification to which the data belongs in accordance with claim 1, and the step of processing the data in accordance with the identified classification.

29. Data processing apparatus for identifying a classification to which data belongs, the data comprising a plurality of features at least some of which are common to a plurality of classifications, the apparatus comprising:

an inputter and extractor, which extracts the features of the data as sequential elements and sequentially inputs the sequential elements until the classification to which the data belongs is identified;

memory for storing predetermined probability values for elements or groups of elements of each classification;

a comparator arranged to receive and sequentially compare each element or group of elements with said predetermined probability values for each classification to determine a probability that the element or group of elements belong to a classification;

an accumulator that accumulates the probabilities to form an accumulated probability with a specified confidence range for each classification; and an identification processor that identifies a classification to which the data belongs from the accumulated probability, said identification processor being arranged to identify a classification as a classification to which the data belongs if the accumulated probability of the classification reaches a predetermined probability threshold and the accumulated probability for the classification is greater than the accumulated probabilities of each of the other classifications by predetermined amount.

30. Data processing apparatus according to claim 29 including an output unit that outputs the accumulated probability.

31. Data processing apparatus according to claim 30 wherein said output unit is arranged to also output the accumulated probability for the identified classification.

32. Data processing apparatus according to claim 30 or claim 31 including a processor that performs further processing on the data.

33. Data processing apparatus according to claim 32 wherein said processor is arranged to process the data differently for data of different classifications and is responsive to said identified classification to process the data accordingly.

34. Data processing apparatus according to claim 29 wherein said identification processor is arranged to identify several of the classifications having the highest accumulated probabilities as possible classifications to which the data belongs if the accumulated probabilities of the classifications do not reach the predetermined probability threshold.

35. Data processing apparatus according to claim 34 wherein said identification processor is arranged to identify several of the classifications having the highest base values of the accumulated probabilities as possible classifications to which the data belongs if the base values of the accumulated probabilities for the classifications do not reach said predetermined probability threshold.

36. Data processing apparatus according to claim 34, including user operable selection beams for selecting a classification from among the possible classifications.

37. Data processing apparatus according to claim 29 wherein each of the probabilities and accumulated probabilities comprise a minimum likely value for the probability within a predetermined confidence range, a maximum likely value for the probability within a predetermined confidence range, and a base value for the probability which is the most likely value, said identification means being arranged to identify a classification as the classification to which the input data belongs if the use value of the accumulated probability for the classification reaches said predetermined probability threshold, and the minimum likely value of the accumulated probability for the classification is greater than the maximum likely values of the accumulated probabilities of each of the other classifications.

38. Data processing apparatus according to claim 37 wherein if the minimum likely value of the accumulated probability for the classification having the highest base value is not greater than the maximum likely value of the accumulated probabilities of each of the classifications, said identification processor is arranged to identify the classifications having the maximum likely values of the accumulated probabilities which are greater than the minimum likely values of the classification having the highest base value as possible classifications to which the data belongs.

39. Data processing apparatus according to claim 37, wherein said memory stores said base values, and said minimum and maximum likely values which are calculated as being two or more standard deviations from the base values of the accumulated probabilities.

40. Data processing apparatus according to claim 29 wherein each of the probabilities and accumulated probabilities comprise a minimum likely value for the probability within a predetermined confidence range, a maximum likely value for the probability within a predetermined confidence range, and a base value for the probability which is the most likely value; said identification means being arranged to identify the classification to which the input data belongs if the base value of the accumulated probability for the classification reaches said predetermined probability threshold.

41. Data processing apparatus according to claim 29 wherein said identifications processor is arranged to identify a classification as a classification to which data belongs if the accumulated probability for a classification having the highest accumulated probability is greater than the accumulated probabilities of each of the other classifications by a predetermined amount.

42. Data processing apparatus according to claim 41 wherein said identification processor is arranged to identify several of the classifications having the highest accumulated probabilities as possible classifications to which the data belongs if the highest accumulated probability is not greater than each of the other accumulated probabilities by said predetermined amount.

43. Data processing apparatus according to claim 41 wherein each of the probabilities and accumulated probabilities comprise a minimum likely value for the probability within a predetermined confidence range, a maximum likely value for the probability within a predetermined confidence range, and a base value for the probability which is the most likely value; said identification processor being arranged to identify a classification as the classification to which the data belongs if the base value of the accumulated probability for the classification is greater than the base values of the accumulated probabilities of the other classifications by said predetermined amount, and the minimum likely values of the accumulated probability for the classification is greater than the maximum values of the accumulated probabilities of each of the other classifications.

44. Data processing apparatus according to claim 29 wherein said inputter and extractor is arranged to input said elements as groups of sequential amounts.

45. Data processing apparatus according to claim 29 wherein said inputter and extractor includes a coding unit that extracts the features of the data by coding the features as sequential elements.

46. Data processing apparatus according to claim 45 wherein said coding unit is arranged to code the features to generate a reduced number of different elements compared with the number of different values in the data.

47. Data processing apparatus according to claim 29 wherein said inputter and extractor is arranged to extract the features of the data by identifying each element in the data which comprises a feature.

48. Data processing apparatus according to claim 29 including a training unit that calculates and stores said predetermined probability values in said memory, said training unit being responsive to training data input by said inputter and extractor to calculate said predetermined probability values, said training data comprising data representative of a known classification.

49. Data processing apparatus according to claim 48 wherein said training unit includes means for determining the frequency of occupance of each element or group of sequential elements.

50. Data processing apparatus according to claim 48 wherein said training unit is arranged to calculate the predetermined probability values using Bayes Rule such that the probability values are given by:

$$p(l|t) = \frac{p(t|l) \cdot p(l)}{p(t)}$$

where:
- p(l|t) is the probability of the classification given the element,
- p(t|l) is the probability of the element given the classification,
- p(l) is the probability of the classification, and
- p(t) is the probability of the element.

51. Data processing apparatus according to claim 48 wherein said training unit is arranged to calculate the predetermined probability values for the sequential elements by calculating the probability of the occurrence of an element in the data input for all of the classification, setting the probability of the occurrence of a classification to a preset level, and calculating the probability of an element occurring in a classification.

52. Data processing apparatus according to claim 51 wherein the probability of the occurrence of a classification is the same and said training unit is arranged to calculate said predetermined probability values by ignoring the probability of the occurrence of a classification.

53. Data processing apparatus according to claim 48 wherein said memory stores the predetermined probability values comprising a minimum likely value for the probability, a maximum likely value for the probability, and a base value for the probability which is the most likely value, said training unit being arranged to calculate the minimum and maximum values as probability values lying within a predetermined confidence range of the base value.

54. Data processing apparatus according to claim 48 wherein said training unit is arranged to calculate probability values for each classification for elements or groups of elements which do not occur in the training data.

55. Data sorting apparatus comprising the data processing apparatus according to claim 29, and a sorting unit for sorting the data in accordance with the identified classification.

56. Data processing apparatus according to claim 29 including a processing unit that processes the data in accordance with the identified classification.

57. A computer usable medium having computer readable instructions stored therein for causing a processor in a data processing apparatus to process signals defining data comprising a plurality of features at least some of which are common to a plurality of classification to identify a classification to which the data belongs, the instructions comprising instructions for:

extracting the features of the data as sequential elements and sequentially inputting the sequential elements or groups of elements until the classification to which data belongs is identified;

for each element or group of elements, comparing the element or group of elements with predetermined probability values for elements or groups of elements of each classification to determine a probability with a specified confidence range that the element or group of elements belong to a classification;

accumulating the probabilities to form an accumulated probability for each classification; and identifying a classification to which the data belongs from the accumulated probability if the accumulated probability reaches a predetermined probability threshold, and the accumulated probability for the classification is greater than the accumulated probabilities of each of the other classifications by a predetermined amount.

* * * * *

UNITED STATES PATENT AND TRADEMARK OFFICE
CERTIFICATE OF CORRECTION

PATENT NO.    : 6,125,362
DATED         : September 26, 2000
INVENTOR(S)   : DAVID ELWORTHY It is certified that error appears in the above-identified patent and that said Letters Patent is hereby corrected as shown below:

Col. 1, line 18, "high" should read --highly--;

Col. 6, line 61, "different" should read --differently--;

Col. 10, line 64, "$P_H(t)$" should read --$P_B(t)$--;

Col. 11, line 44, "were" should read --where--;

Col. 19, line 42, "or claim 31" should be deleted.

Signed and Sealed this

Twenty-fourth Day of April, 2001

Attest:

NICHOLAS P. GODICI

Attesting Officer

Acting Director of the United States Patent and Trademark Office